US012809696B2

(12) United States Patent
Ibanez et al.

(10) Patent No.: US 12,809,696 B2
(45) Date of Patent: Nov. 24, 2026

(54) PROGRAMMABLE ARCHITECTURE FOR STATEFUL DATA PLANE EVENT PROCESSING

(71) Applicant: Intel Corporation, Santa Clara, CA (US)

(72) Inventors: Stephen Ibanez, Escondido, CA (US); Robert Southworth, Chatsworth, CA (US); Salma Mirza Johnson, Littleton, MA (US); Vered Bar Bracha, Tel Aviv (IL); Bradley A. Burres, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/089,453

(22) Filed: Dec. 27, 2022

(65) Prior Publication Data

US 2023/0139762 A1 May 4, 2023

Related U.S. Application Data

(60) Provisional application No. 63/419,960, filed on Oct. 27, 2022, provisional application No. 63/342,909, filed on May 17, 2022.

(51) Int. Cl.

| | |
|---|---|
| ***G06F 9/54*** | (2006.01) |
| ***G06F 9/48*** | (2006.01) |
| ***G06F 9/50*** | (2006.01) |
| ***G06F 9/52*** | (2006.01) |

(52) U.S. Cl.

CPC ............ *G06F 9/542* (2013.01); *G06F 9/4881* (2013.01); *G06F 9/5016* (2013.01); *G06F 9/52* (2013.01)

(58) Field of Classification Search

CPC ...... G06F 9/542; G06F 9/4881; G06F 9/5016; G06F 9/52

See application file for complete search history.

(56) References Cited

U.S. PATENT DOCUMENTS

| | | | | |
|---|---|---|---|---|
| 5,226,143 | A * | 7/1993 | Baird | G06F 12/0815 711/147 |
| 9,081,501 | B2 * | 7/2015 | Asaad | G06F 15/76 |
| 9,860,258 | B1 * | 1/2018 | Collins | H04L 63/08 |
| 10,997,273 | B2 | 5/2021 | Pratas et al. | |

(Continued)

OTHER PUBLICATIONS

Lacurts, Katrina, "Basic Reliable Transport Protocols", 2018, 8 pages.

(Continued)

*Primary Examiner* — April Y Blair
(74) *Attorney, Agent, or Firm* — Compass IP Law PC

(57) ABSTRACT

Examples described herein relate to a network interface device that includes a programmable event processing architecture comprising a plurality of programmable event processors. When the plurality of programmable event processors are operational, one or more of the programmable event processors are to perform memory accesses separate from compute operations, group one or more events into at least one group, enforce atomic processing of other events within a group of the at least one group, wherein the atomic processing comprises propagation of state changes to among events of the group, and perform parallel processing of events belonging to different groups.

20 Claims, 17 Drawing Sheets

(56) References Cited

U.S. PATENT DOCUMENTS

| | | | | |
|---|---|---|---|---|
| 2006/0077737 | A1* | 4/2006 | Ooishi | G11C 13/0069<br>365/203 |
| 2012/0204018 | A1 | 8/2012 | Asnaashari et al. | |
| 2017/0123724 | A1* | 5/2017 | Park | G11C 16/0483 |
| 2017/0220608 | A1* | 8/2017 | Sturm | G06F 16/2365 |
| 2018/0113951 | A1* | 4/2018 | Tanner | G06F 16/90344 |
| 2020/0235929 | A1* | 7/2020 | Jacobs | H04L 9/3073 |
| 2020/0296009 | A1 | 9/2020 | Dawes et al. | |
| 2021/0112003 | A1 | 4/2021 | Marolia et al. | |
| 2021/0326175 | A1* | 10/2021 | Herbert | G06F 9/541 |
| 2021/0344781 | A1 | 11/2021 | Zhang et al. | |
| 2022/0157372 | A1* | 5/2022 | He | G11C 7/1042 |
| 2022/0171630 | A1* | 6/2022 | Dang | G06F 9/3856 |
| 2022/0292626 | A1 | 9/2022 | Agostini | |
| 2023/0127722 | A1 | 4/2023 | Ibanez et al. | |

OTHER PUBLICATIONS

Shanley, Tom, "InfiniBand Network Architecture", MindShare, Inc., https://www.oreilly.com/library/view/infiniband-network-architecture/0321117654/0321117654_ch11lev1sec1.html, Printed May 5, 2022, 2 pages.

Arashloo, Mina Tahmasbi et al., "Enabling Programmable Transport Protocols in High-Speed NICs", 17th USENIX Symposium on Networked Systems Design and Implementation (NSDI '20), Feb. 25-27, 2020, Santa Clara, CA, USA, 18 pages.

Handley, Mark et al., "Re-architecting datacenter networks and stacks for low latency and high performance", 2017, 14 pages.

Mittal, Radhika et al., "Revisiting Network Support for RDMA", SIGCOMM '18, Aug. 20-25, Budapest, Hungary, 14 pages.

Montazeri, Behnam et al., "Homa: A Receiver-Driven Low-Latency Transport Protocol Using Network Priorities", SIGCOMM '18, Aug. 20-25, 2018, Budapest, Hungary, 15 pages.

Olteanu, Vladimir et al., "An edge-queued datagram service for all datacenter traffic", 19th USENIX Symposium on Networked Systems Design and Implementation, Apr. 4-6, 2022, Renton, WA, USA, 18 pages.

First Office Action for U.S. Appl. No. 17/746,611, Mailed Jul. 3, 2025, 10 pages.

Extended European Search Report for Patent Application No. 25226130.0, Mailed Jun. 2, 2026, 10 pages.

* cited by examiner

1202

1204

PROGRAMMABLE ARCHITECTURE FOR STATEFUL DATA PLANE EVENT PROCESSING

RELATED APPLICATIONS

This application claims the benefit of and priority to U.S. Provisional Application No. 63/342,909, filed May 17, 2022, and U.S. Provisional Application No. 63/419,960, filed Oct. 27, 2022. The entire contents of those applications are incorporated by reference in their entirety.

BACKGROUND OF THE INVENTION

Programmable data plane event processing systems can be implemented using a variety of devices such as general-purpose processors, field-programmable gate arrays (FPGAs), and domain-specific event processing application-specific integrated circuit (ASIC) designs. Programmable data plane event processors can be used to build network packet processing systems that operate at or near line rate (e.g., an upper rate of egress of packets from a network interface device). In order to avoid possible read or write hazards, some programmable packet processing systems implement read-modify-write operations atomically per-packet (e.g., within a single clock cycle) to perform simple stateful packet header transformations, which can limit the scope of applicable stateful packet processing algorithms.

DETAILED DESCRIPTION

Figure 1:
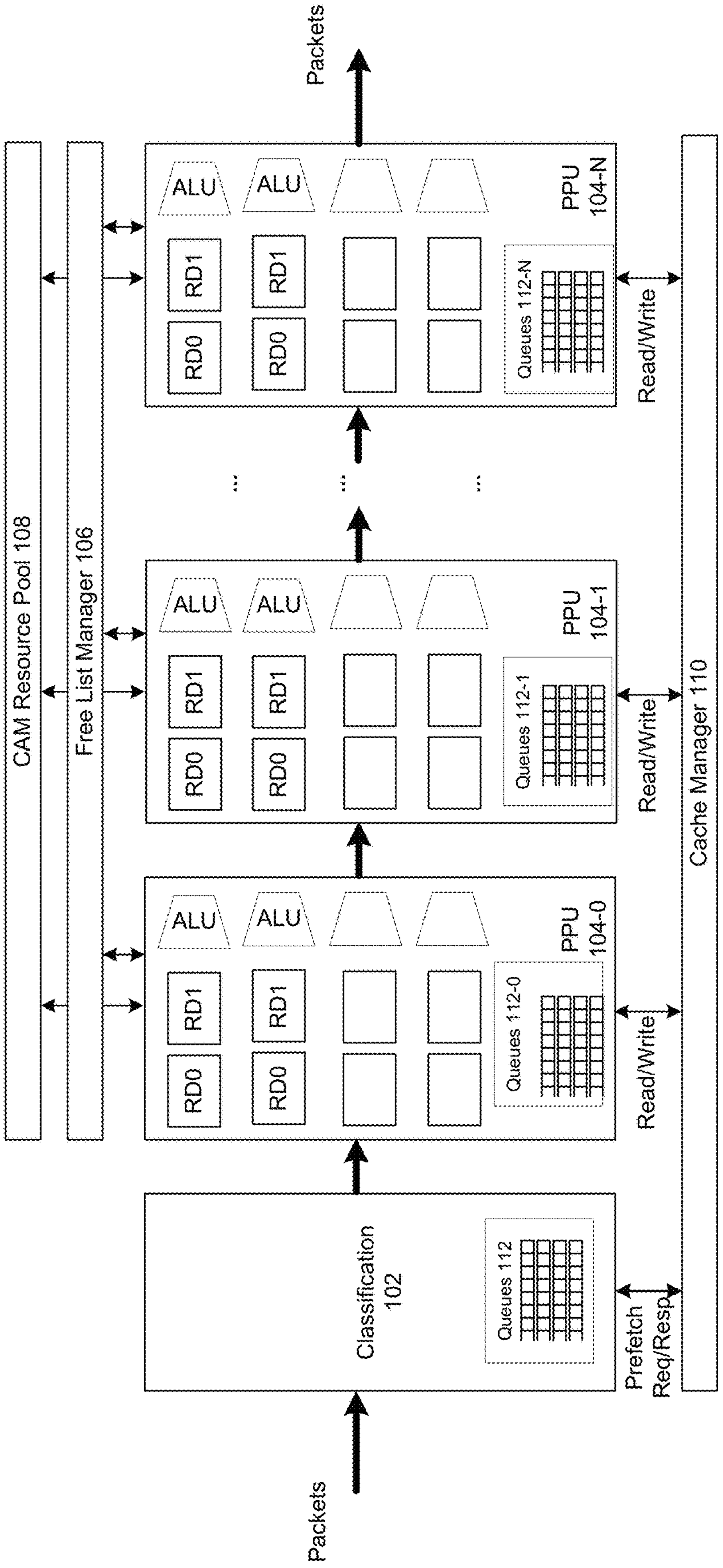
FIG. 1 depicts a high-level block diagram of a programmable pipeline as part of a programmable transport architecture (PTA).

Various examples described herein include a programmable data plane event processing architecture that can perform stateless or stateful operations. Various examples include a programmable packet or event processing pipeline that performs stateful operations such as multi-instruction or multiple arithmetic logic unit (ALU) operations over multiple clock cycles. One or more packet processing units (PPUs) and/or event processing units (EPUs) of the programmable architecture can include a programmable engine that is capable of performing read-modify-write operations on a set of state variables. One or more EPUs can at least execute very long instruction word (VLIW) instructions to cause processing of an event's metadata fields in series or in parallel.

One or more EPUs can perform stateful event processing on one or more of: global state or flow state. Global state (e.g., global connection state) can be shared across flows and must be updated atomically per-event whereas flow state can be updated atomically between events belonging to the same flow. A flow or group can represent a particular grouping of data plane events. The flow ID (or group ID) can be determined by a subset of the event metadata fields.

State can include per-connection information for reliability and congestion control (e.g., packet sequence numbers). State can include telemetry data, security data, and metadata for outstanding packets (e.g., transmitted packets for which acknowledgement of receipt has been received (not ACKd)). One or more EPUs can perform multiple ALU operations per state update. Event metadata and/or memory data can be updated by each EPU stage. Memory data can include flow state or per-packet state.

Some examples provide a programmable architecture consisting of one or more EPUs. An EPU can perform read-modify-write operations on a set of state variables. At least one EPU can process 1 event per clock cycle. An EPU may utilize one or more programmable compute engines to execute VLIW instructions in order to process multiple event metadata fields in parallel. One or more programmable compute engines may be integrated into an EPU or programmable compute engines may be assigned to each EPU from a disaggregated resource pool at compilation time of an event processing program.

Static random access (SRAM) and content addressable memory (CAM) resources may either be integrated into each EPU or may be allocated to each EPU from a disaggregated resource pool at compilation time of an event processing program. These memory resources may be utilized as an on-chip cache backed by off-chip memory.

For example, when a packet of a flow experiences a cache miss and a second flow experiences a cache hit, processing of the packet of the flow with an associated cache hit can proceed but processing of the packet of the second flow may stall. The programmable pipeline can assign a packet to an ordering domain to enforce ordering between packets within a same flow but allow packets of different flows to bypass at least one packet of a different flow.

The EPU may utilize primitives to provide support for programmable operations on data structures such as linked lists, doubly linked lists, tree structures, and exact match tables. An exact match table can be used to store connection state such as counters, pointers for per-connection data structures, and so forth. The primitives can be used to manipulate data structures: (1) perform memory access pattern for data structures (e.g., two sequentially dependent memory reads followed by an update to the first address), (2) free lists to implement memory allocation and deallocation, and/or (3) compute primitives which can be used to manipulate data structure pointers.

In some examples, linked lists can be used to implement per-flow queues. Nodes used to build the linked list can be dynamically allocated as needed, and a free list can be used to manage available memory handles.

Developers can generate programs that are executed by the pipeline to perform read-modify-write operations on global or general state information and to perform read-modify-write operations on flow state. One or more PPUs or EPUs can perform arithmetic and logical operations that can be composed together. One or more PPUs or EPUs can perform programmable operations on data structures such as linked lists and exact match tables. Exact match tables can support data insertions, deletions, and lookup operations and a programmer can construct linked lists and express operations on the linked lists.

The programmable data plane event processor can be integrated in a packet processing or event processing devices such as a network interface device for programmability of data center transport protocols and for gathering and processing network telemetry metrics.

For example, an event processor can issue memory accesses to a memory pool (e.g., CAM and/or SRAM pool) and package accessed connection context with event data (e.g., header or metadata about a packet (connection ID)) and indicate to an ALU pipeline or pool which program to run and provides connection context with event data to ALU (pipeline or pool) to process. An event processor can identify events that might access same state (same connection ID), complete processing of multiple packets that access the same state in order and queue events of same connection ID to enforce order and separately allow parallel processing of packets of other connection IDs. An event processor can enforce memory access patterns to allow multiple packets with different connection IDs to access different state and can be processed in parallel or dependent handling of packets of same connection ID using free lists or global counters (resource counters). For example, an event can correspond to one or more of: packet arrival, packet is to be transmitted, timer expired (retransmit timer), packet coalescing timer, queue is next to be scheduled, EPU can generate events that control cache content (evict or load). A programmable stateful dataplane can be programmed using an event graph description with event handling executed on different EPUs with parallel access to compute resources and memory resources. Hardware can be allocated to handle memory access patterns scheduled based on connection ID to update state before next event handled for connection ID that might modify the same state, such as read entry and write back, first read and read dependent on results of first read, exact match lookup, or others. A programmable compute can be programmed independent from memory access.

A Cloud Service Provider (CSP) or Communication Service Provider (CoSP) can utilize the programmability and performance of the architecture to implement network transport protocols and/or congestion control for a tenant and its services (e.g., one or more processes, applications, virtual machines (VMs), containers, microservices, and so forth).

FIG. 1 depicts a high-level block diagram of a programmable pipeline as part of a programmable transport architecture (PTA). A programmable pipeline can include one or more packet processing units (PPUs) 104-0 to 104-N, where N is an integer of 2 or more. However, merely one or two PPUs can be included. A PPU can process one or more packets per clock cycle (e.g., 1 billion packets per second (Bpps) at 1 GHz or other speeds).

For received packets, classification 102 can identify a packet's flow ID and issue a command to cache manager 110 to prefetch flow state at a start of a pipeline of processing the packet. Classification 102 can stall processing of the packet until the corresponding flow state is loaded into caches by cache manager 110. Flow state can be accessed for packet processing in subsequent pipeline stages (e.g., one or more of PPUs 104-0 to 104-N). Classification 102 can assign the packet to an ordering domain and associated ordering queue 112 by hashing the flow ID. Classification 102 can access an exact match table to access global state such as pointer to connection state for a connection, per-packet state, counters, and so forth.

A flow can represent a sequence of packets being transferred between two endpoints, generally representing a single session using a known protocol. Accordingly, a flow can be identified by a set of defined tuples and, for routing purpose, a flow is identified by the two tuples that identify the endpoints, e.g., the source and destination addresses. For content-based services (e.g., load balancer, firewall, intrusion detection system, etc.), flows can be differentiated at a finer granularity by using N-tuples (e.g., source address, destination address, IP protocol, transport layer source port, and destination port). A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier. A packet may be used herein to refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

After classification 102, packets can be processed by a pipeline of one or more PPUs 104-0 to 104-N. A PPU can access flow state from cache manager 110. Read stages (e.g., RD0 or RD1) can perform dependent reads from cache manager 110. A head pointer can be read and then first entry in list can be read based on the head pointer. Sequential read stages can perform linked list pop operations (as described herein).

PPUs 104-0 to 104-N can include respective ordering domain queues 112-0 to 112-N that can be allocated to one or more ordering domains. Packets of flows can be mapped to queues 112-0 to 112-N. Queues 112-0 to 112-N can be used to preserve ordering of packets of flow. Packets can be processed by different stages of PPUs and are stored in queues 112-0 to 112-N. A packet can be stored in a queue until a cache is filled with the packet's flow state. Processing of the packet can be stalled in case of a cache miss of flow state. Ordering domain queues 112-0 to 112-N can be used to control packets of a same flow to be processed in first in first out (FIFO) order and to enforce the time spacing between packets of the same flow. Packets that belong to a flow which map to a same ordering domain queue can head-of-line block packets of another flow. Hence, use of ordering domain queues 112-0 to 112-N for a particular flow can reduce head-of-line blocking.

Packets within an ordering domain can be processed in FIFO order and packets of a given flow can be processed in FIFO order. In some examples, packets in different ordering domains or flows can bypass one another so that packets in a first ordering domain or flow can bypass packets in a second, different ordering domain or flow. Allowing packets of different flows to bypass one another can reduce an amount of head of line blocking caused by packets of different flows. If there are more flows than queues, a hash can be used to assign packets of a flow to a queue or load balance queues.

One or more of PPUs 104-0 to 104-N can include one or more read-modify-write circuitry. Read-modify-write circuitry can perform programmable read-modify-write operations on a set of state variables. For example, read circuitry RD0 and RD1 can read state data for a packet from a cache or memory allocated by cache manager 110. Stateful ALU circuitry (ALU) can modify and update state variables, packet header, and metadata fields. An ALU can perform multiple cycles of computation. The read-modify-write circuitry (e.g., RD0, RD1, and ALU) can include two sequential read stages and a stateful ALU module, although other numbers of sequential read stages and stateful ALU modules can be included in a read-modify-write (RMW) circuitry.

RMW on global state data at high rates is challenging because pipeline read, modify, write operations must finish updating the state before processing the next packet uses the state. In some examples, PPUs 104-0 to 104-N can process one packet per cycle and RMW operations on global state can be completed in a single clock cycle. In some cases, a flow has performance target (e.g., packets processed per second) to process one packet/y clock cycles. Some examples of PPU 104-0 to 104-N can perform RMW on flow state updated for packets of a same flow so that y cycles of pipelined operations (over multiple stages) can be permitted to finish RMW. In some cases, ordering infrastructure (one or more of queues 112-0 to 112-N) can be used to enforce stalling of another packet of a flow to allow multiple cycles to finish RMW for state processing of a packet of a flow.

Cache manager 110 can manage a pool of one or more caches (e.g., static random access memory (SRAM) caches). One or more cache devices can store flow state read from memory (e.g., dynamic random access memory (DRAM)). A cache can include one read port and one write port to a PPU stage (e.g., one or more of PPU 104-0 to 104-N). The read and write ports for a cache can be assigned to a single PPU at packet processing pipeline program (e.g., Protocol-independent Packet Processors (P4) or others) compilation time. In other words, read-modify-write operations on a given memory address can be performed within a single PPU and not be split across PPUs.

A pool of one or more SRAM and content-addressable memory (CAM) resources can be assigned to one or more PPUs at compilation of a pipeline program (e.g., P4 or others). A write back cache can allow scaling available memory beyond on-chip memory. A CAM resource pool can be used to implement exact-match action tables in some examples to be used to look up connection state or metadata. CAM resources can implement a read and write interface, which can be statically assigned to a PPU at pipeline program compile time. Contents of CAM resource pool can be modified by insertions or deletions.

Free list manager 106 can maintain free lists which can be used to implement resource allocation. For example, free lists can be used to implement dynamic memory allocation for linked list data structures, or to allocate unique packet identifiers. Push and pop interfaces for a free list can be statically assigned to a PPU at pipeline program compilation time. In some examples, free list manager 106 can provide one or more free list addresses per packet and one or more free list addresses can correspond to an address in cache or memory to store read but subsequently modified data such as modified state data. Free list manager 106 can perform pop or push of entries for free lists in cache. Free list manager 106 can be used for dynamic memory allocation.

Classification 102, PPUs 104-0 to 104-N, free list manager 106, CAM resource pool 108, and/or cache manager 110 can be programmed with a pipeline program consistent with one or more of: P4), Software for Open Networking in the Cloud (SONiC), Broadcom® Network Programming Language (NPL), NVIDIA® CUDA®, NVIDIA® DOCA™, Data Plane Development Kit (DPDK), OpenDataPlane (ODP), Infrastructure Programmer Development Kit (IPDK), eBPF, x86 compatible executable binaries or other executable binaries, among others.

Figure 2A:
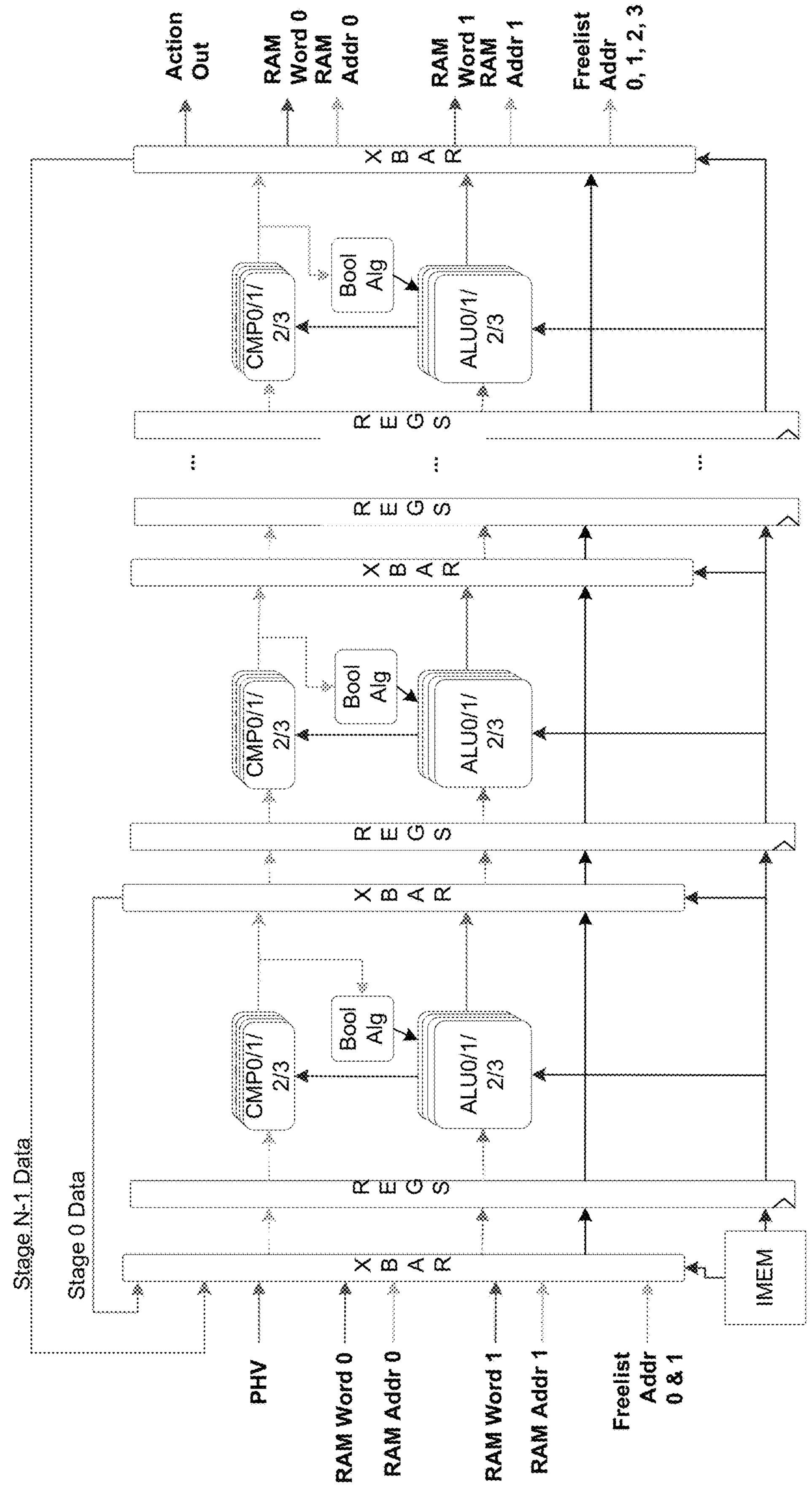
FIG. 2A depicts an example block diagram of a stateful ALU.

FIG. 2A depicts an example block diagram of a stateful ALU. An ALU can process one or more of the following inputs: packet header vector (PHV) (e.g., packet metadata), words and addresses, or free list addresses. PHV or metadata can include a subset of the packet header and metadata fields that are relevant to the processing implemented by this stateful ALU. RAM words (e.g., RAM word 0 and RAM word 1) and addresses (e.g., RAM Addr 0 and RAM Addr 1) can be provided as a result of the two previous read stages in the read-modify-write (e.g., PPU stage). Two read stages can allow reading two dependent reads from SRAM cache manager. A first read head pointer and a second read reads a first entry in list based on first read head pointer. Free list addresses (e.g., Freelist Addr 0 and 1) can be pre-allocated to the packet and may or may not be claimed. If the addresses are not claimed they are returned back to the free list at the end of the stateful ALU pipeline. Other numbers of RAM words, RAM addresses, and Freelist addresses can be used.

A stateful ALU pipeline can include X compute stages (where X is an integer) (e.g., CMP0, 1, 2, 3) to allow a developer to implement (up to) Y-instruction (where Y is an integer) read-modify-write operations on flow state. In order to provide atomicity of stateful operations, a single packet from a given flow can be processed by compute stages at a time. X compute stages can be used to implement X-cycle RMW operations on connection state. The architecture can limit processing of a single packet from a given connection by these compute stages at a time. Atomic processing can refer to an event receiving side effects (e.g., state changes, metadata changes) caused by previous events.

A compute stage (e.g., one or more of CMP0, 1, 2, 3) can include compute ALUs, comparison ALUs, and programmable logic for Boolean algebra. The compute ALUs can perform simple arithmetic or bitwise operations. The comparison ALUs can perform comparison operations and produce a Boolean value to indicate the result. The programmable logic for Boolean algebra can use a programmable logic array (PLA) to compute new predicates and in turn tells the crossbar how to update the operands for the next stage. Bool algebra (Alg) can perform boolean arithmetic on outputs from compute stages.

ALUs (e.g., one or more of ALU0, 1, 2, or 3) can support instructions for packet sequence number (PSN) arithmetic and bitmap operations to take into account that PSN values can wrap around. ALU operations based on instructions for transport protocols: bitmap operations, boolean, add, subtract, first set bit, and others.

A bypass path (e.g., Stage N−1 data and Stage 0 Data) can be used to support single cycle RMW operations, which is used to implement updates on global state that is shared across connections. Bypass paths support single cycle and N-cycle read-modify-write operations. Single cycle read-modify-write operations can be used to update global state that is shared across flows. Bypass paths can be added to implement stateful operations with different performance requirements. For example, a bypass line can permit a single clock cycle operation on global state so that read-modify-write occur atomically on multiple packets.

Outputs from a stateful ALU can include update metadata and returning unclaimed (or freed) free list addresses. In addition to returning unclaimed (or freed) free list addresses (e.g., Freelist Addr 0-3), the stateful ALU can output two (or other numbers) of RAM write commands (RAM Word 0 and 1 and RAM Addr 0 and 1), which can be performed in parallel as long as they target different memories to push new entries onto a linked list. Freelist addresses 0 and 1 can be pre-allocated to packet and Freelist addresses 2 and 3 can be freed for packet. The use of two is merely an example and other numbers can be used other than two.

General or global state can represent state shared between multiple different flows. In some examples, a PPU can execute single-instruction read-modify-write operations on general or global state, such as incrementing or decrementing global counter statistics to count outstanding packets. One or more PPUs of a programmable pipeline can execute multi-instruction or multiple ALU operations over multiple clock cycles to perform read-modify-write operations on flow state data, such as general or global state.

For example, a programmable pipeline can perform transport protocol logic for a flow. Multi-instructions or multiple ALU operations over multiple clock cycles can be performed on connection state. In some cases, performance goals for a single connection processing speed are less than line rate.

The code segment below shows an example of RMW operation on connection state in a sequence to update a receiver's sliding window as packets arrive over the network. A sliding window can represent a window of packets that a receiver is currently able to process. For example, arriving packets whose packet sequence number (PSN) falls before the window have already been received and hence are duplicates and packets whose PSN falls beyond the window have arrived too far out of order for the receiver to handle.

In this example, 5 ALU operations can be performed by one or more PPUs to modify connection state. Connection state can represent protocol-specific state variables used by the connection to implement tasks such as reliable delivery, congestion control, resource management, etc. A stateful operation can be implemented atomically between packets of the same connection.

```
// Atomically update receiver sliding window.
ReceiverConnectionState_t conn_state;
@atomic {
  conn_state = receiver_connection_state.read(CID);
  bit<8> slide_amount;
  // Set bit (PSN - BPSN).
  conn_state.bitmap = conn_state.bitmap | (1 << (PSN -
  conn_state.BPSN));
  // Update BPSN to the next unset bit and slide the window.
  slide_amount = find_first_zero(conn_state.bitmap);
  conn_state.BPSN = conn_state.BPSN + slide_amount;
  conn_state.bitmap = conn_state.bitmap << slide_amount;
  // Write the updated state back into memory.
  receiver_connection_state.write(CID, conn_state);
}
```

In some examples, linked lists can be used to implement per-flow queues. For some linked lists, push and pop operations do not involve multiple reads from or writes to the same memory and an empty linked list may not be allocated to a node. A node can represent a memory address. Nodes used to build the linked list can be dynamically allocated as needed, and a free list can be used to pass available memory handles.

Note that the linked list head (LL_head) and tail pointers (LL_tail) and the actual nodes can be stored in memories and thus these writes can occur in parallel.

Figure 2B:
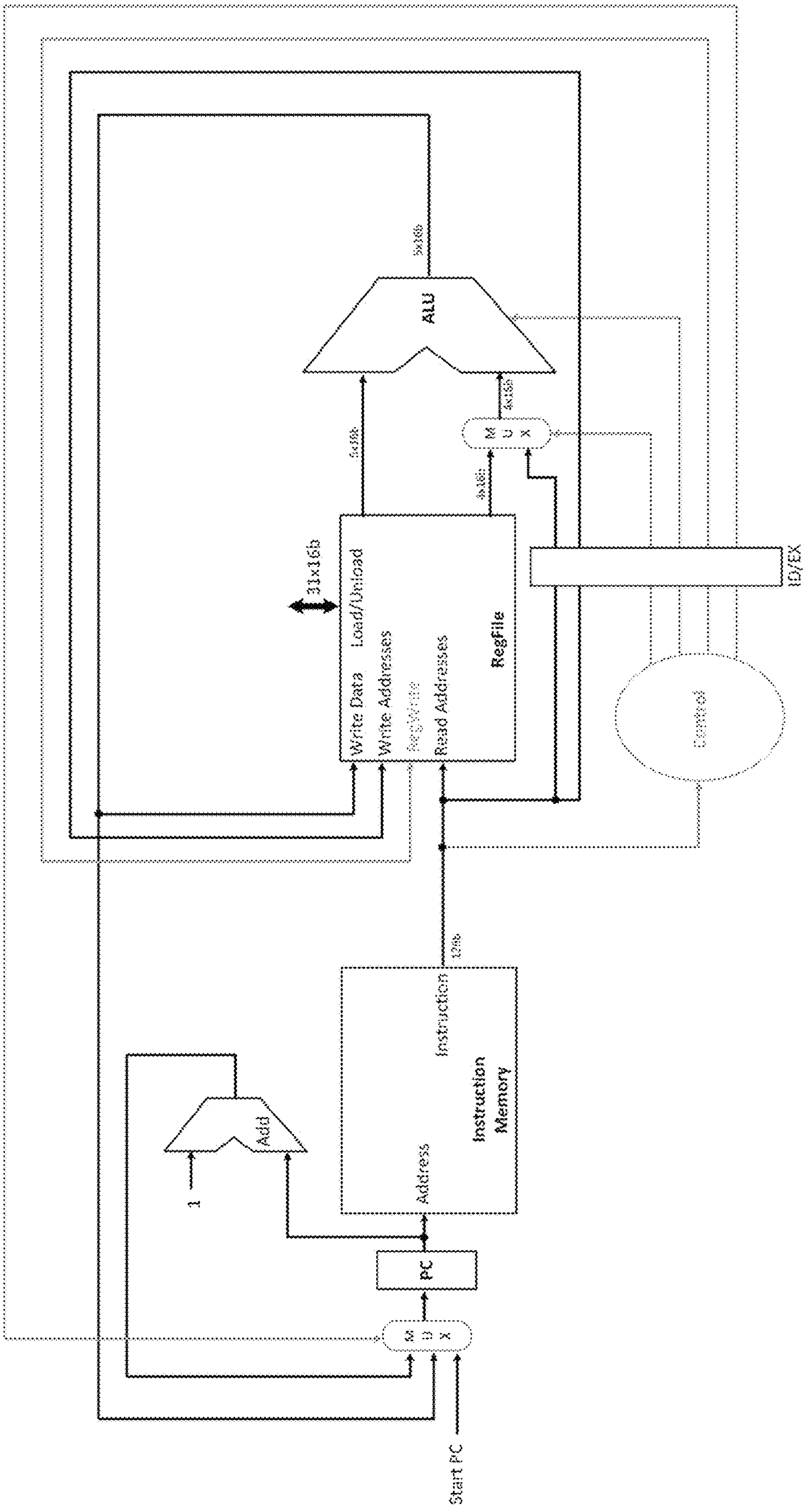
FIG. 2B depicts an example PTA ALU core.

FIG. 2B depicts an example PTA ALU core. An instruction memory can store event processing programs. A register file can store current thread state. A VLIW ALU can perform compute operations to update thread state.

Figure 3:
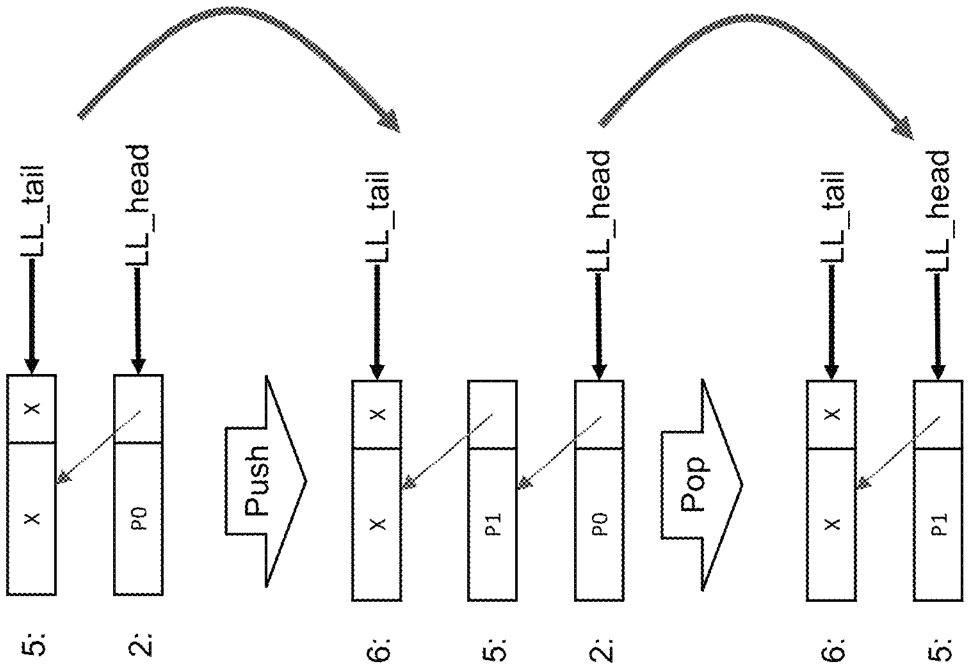
FIG. 3 shows a manner to represent a linked list with a single entry in memory.

FIG. 3 shows a manner to represent a linked list with a single entry in memory. Linked lists can be manipulated or modified in one or more PPU stages of a pipeline. To push an entry to a linked list, two memory writes to two different memories can be performed: write to tail pointer (LL_tail) points to and update tail pointer to identify next free node. The tail pointer points to a next node to fill out when the next item is pushed onto the back of the linked list.

To pop an entry from the linked list, two memory reads to two different memories can be performed: read head pointer and read node that head pointer points-to. Two sequentially dependent memory reads can be performed when popping a head entry off the linked list: fetch the head pointer (LL-_head) and then fetch the node that the head pointer points to in order to move the head pointer forward. The head pointer can be updated using the result of the second read operation. Note that these two read operations can be pipelined because they are issued to separate memories.

In some examples, as shown, three memory accesses can be performed for push and pop operations on the linked list. However, more linked list operations can be supported than push and pop. For example, developers can write pipeline programs that can push to either the front or back of a linked list, or implement a go-back-N queue, such as used for transport protocol implementations such as remote direct memory access (RDMA) over Converged Ethernet (RoCE).

Figure 4:
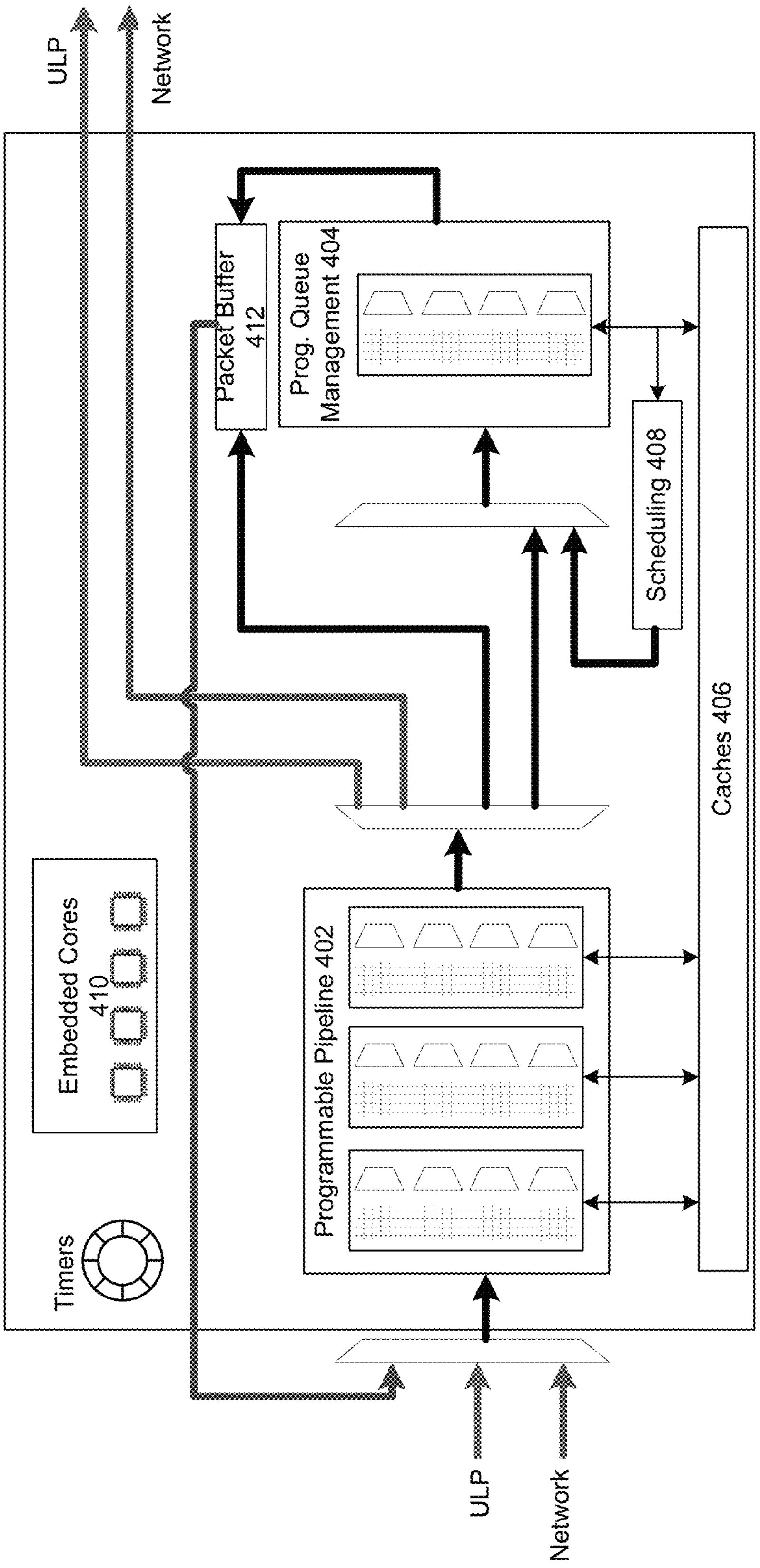
FIG. 4 depicts an example configuration of a programmable transport architecture.

FIG. 4 depicts an example configuration of a programmable transport architecture. In some examples, PTA can process 200 Mpps (million packets per second) in transmit and receive directions, or other packets per second. Programmable packet processing pipeline 402 of PTA can be configured by a packet processing program to perform stateful operations on connection state such as the protocol state used to implement reliable delivery (e.g., packet sequence numbers, packet transmission timestamps, acknowledgement (ACK) coalescing state, etc.) or congestion control (e.g., congestion window, round trip time estimates, etc.). CSPs can write a packet processing program to implement and deploy custom transport protocol.

One or more instances of a stateful programmable pipeline 402 can be used. For example, an instance of a stateful programmable pipeline 402 can process packets on transmit and receive and another instance of a stateful programmable pipeline 402 can process queueing related events. Pipelines can process one event per cycle (e.g., 1 billion events/sec). Programmable queue management pipeline 404 can manage transmit (TX) or receive (RX) queues and enforce a programmable congestion control policy.

Programmable queue management 404 that can be implemented using similar programmable primitive utilized for programmable packet processing pipeline 402. Programmable queue management 404 can utilize primitives for implementing scheduling decisions amongst queues, as well as primitives for implementing the memory access pattern and memory allocation required for linked lists. A programmer can use these primitives to configure utilization of a queue data structure and decide how to enable/disable queues for scheduling.

Programmable queue management 404 can manage a connection's transmit and receive queues and enforce a congestion control policy by marking queues as either active or inactive. Queue management 404 can process queueing events such as packets to enqueue, scheduling events, or congestion control state update events.

Protocol state can be cached in on-chip static random access (SRAM) or other memory and backed by Double Data Rate (DDR) memory 406 or other memory. Protocol state can be used for implementing reliable packet delivery, congestion control, telemetry, etc.

Configurable scheduling 408 can schedule packets for transmission from active queues and can generate scheduling events to be processed by programmable pipeline 402 to perform a configurable scheduling policy to arbitrate across queues that have been marked as active by programmable queue management 404. Scheduling 408 can generate scheduling events that indicate the selected connection and queue identifier (ID). Programmable queue management 404 can process the scheduling event and fetch the packet state from the corresponding connection and queue ID. Scheduling 408 can implement a configurable, hierarchical scheduling policy to schedule packet transmissions from amongst the active queues.

Scheduling 408 can schedule packet transmission from among the active queues and generate scheduling events for the programmable queue management. Upon processing a scheduling event, programmable pipeline 402 can determine if a packet is to be transmitted from the indicated queue. If so, programmable pipeline 402 can read a packet descriptor from the indicated queue and cause transmission of the corresponding packet from packet buffer 412. Packets transmitted from packet buffer 412 can be processed by programmable pipeline 402 again before transmission to the network. Depending on the protocol logic, the packet may remain buffered, and the packet descriptor may remain in the transmit queue in order to facilitate retransmissions if needed. Upon being successfully acknowledged, the packet and descriptor can be freed for reuse.

General purpose embedded processor cores 410 can be configured to process low event rate processing, such as connection management and processing congestion signals.

Packet buffer 412 can store packet header, data, and metadata as well as scheduling timer events. For reliable transport, packet buffer 412 can store packet data until it the packet data was successfully delivered to a remote endpoint. Packet buffer 412 can store packets to be retransmitted in an event of an indication that a packet was not received (e.g., negative acknowledgement (NACK) or no receipt of an ACK within a timed interval. Timer events can be processed by the programmable pipeline are used to implement tasks such as generating packet retransmissions, performing ACK coalescing, and generating probe packets.

When a protocol engine (e.g., RDMA PE 502) generates a packet to be transmitted on a given connection, the packet can be processed by the programmable packet processing pipeline (e.g., PTA 504). PTA 504 can perform operations such as allocating buffer resources for the packet, assigning a packet sequence number, and other protocol-specific operations. The packet can be buffered and, in parallel, processed by programmable queue management, as described herein. Programmable queue management can insert a packet descriptor into the appropriate transmit queue and, if the congestion control policy allows it, mark the queue as active. Transmit queues can be implemented as linked lists in cacheable memory.

Figure 5:
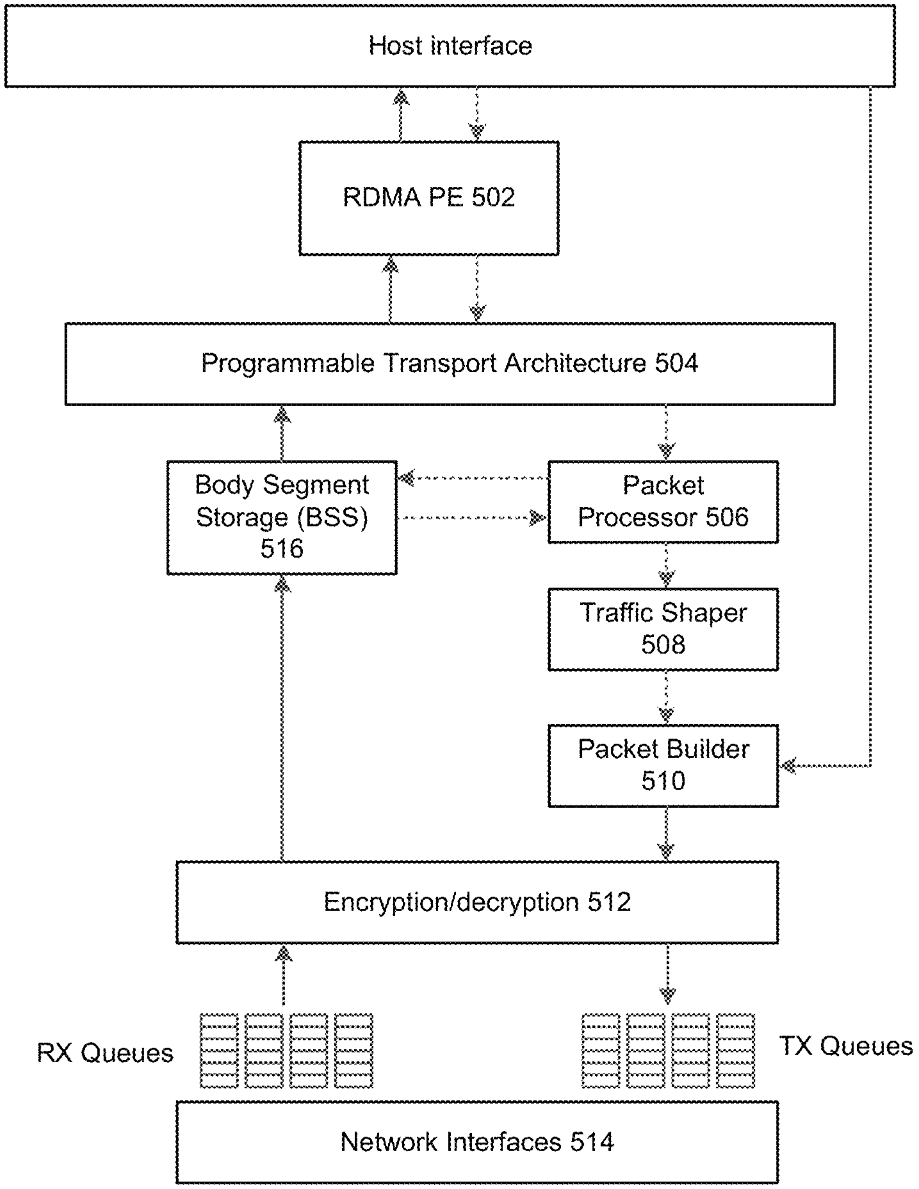
FIG. 5 depicts an example programmable transport architecture system.

FIG. 5 depicts an example programmable transport architecture system. The system can be integrated into a network interface device. In some examples, a network interface device can refer to one or more of: a network interface controller (NIC), a remote direct memory access (RDMA)-enabled NIC, SmartNIC, router, switch, forwarding element, infrastructure processing unit (IPU), or data processing unit (DPU). Various examples of a network interface device are described at least with respect to FIGS. 10, 11, 12, and/or 13.

RDMA protocol engine (PE) 502 can implement the InfiniBand Verbs application interface, and programmable transport architecture (PTA) 504 can provide reliability and congestion control for the packet generated by an RDMA PE 502. PTA 504 can provide sufficient programmability to support various data center transport protocols. Examples of transport protocols include at least: remote direct memory access (RDMA) over Converged Ethernet (RoCE), RoCEv2, Amazon's scalable reliable datagram (SRD), Amazon AWS Elastic Fabric Adapter (EFA), Microsoft Azure Distributed Universal Access (DUA) and Lightweight Transport Layer (LTL), Google GCP Snap Microkernel Pony Express, High Precision Congestion Control (HPCC) (e.g., Li et al., "HPCC: High Precision Congestion Control" SIGCOMM (2019)), improved RoCE NIC (IRN) (e.g., Mittal et al., "Revisiting network support for RDMA," SIGCOMM 2018), Homa (e.g., Montazeri et al., "Homa: A Receiver-Driven Low-Latency Transport Protocol Using Network Priorities," SIGCOMM 2018), NDP (e.g., Handley et al., "Re-architecting Datacenter Networks and Stacks for Low Latency and High Performance," SIGCOMM 2017), and/or EQDS (e.g., Olteanu et al., "An edge-queued datagram service for all datacenter traffic," USENIX 2022).

Non-limiting examples of PTA 504 are described with respect to FIGS. 6A-6C. Configuration of PTA 504 can occur by packet processing program. PTA 504 can be configured to perform one or more of: remote direct memory access (RDMA) connection management setup and tear down and exception handling; reactive congestion control collect and transmit congestion signals (e.g., explicit congestion notification (ECN), determination of round trip time (RTT), determination of queue size, indication of link utilization) and react by updating transmit (TX) rate or congestion window (CWND); proactive congestion control proactively schedule network transfers to avoid congestion (e.g., receiver-driven credit management); loss detection detects packet loss (e.g., timeouts, duplicate ACKs, explicit NACKs); reliable delivery to recover from packet loss (e.g., go-back-N, selective retransmissions); received packet reordering before delivering to upper layer protocol or application for processing; scheduling, shaping, and congestion control (CC) enforcement policy used to select which packet to schedule next and when to transmit the packet; and/or packetization and reassembly to convert between message streams and packets. PTA 504 can utilize one or more EPUs, which can process at least one packet or data plane event per cycle while performing stateful operations on connection state using multi-instructions or multiple ALU operations over multiple clock cycles as well as programmable operations on data structures such as linked lists and exact match tables.

For packets to be transmitted from PTA 504, packet processor 506 can perform additional packet processing such as encapsulation or decapsulation for network virtualization, traffic shaper 508 can pace transmission rate of packets into a network, packet builder 510 can fetch packet data from host memory to build outgoing packets, encryption/decryption 512 can perform encryption of packets prior to transmission to a network using network interfaces 514.

For packets received from a network by network interfaces 514, encryption/decryption 512 can perform decryption of packets and body segment storage (BSS) 516 can store packets prior to processing by PTA 504.

Figure 6:
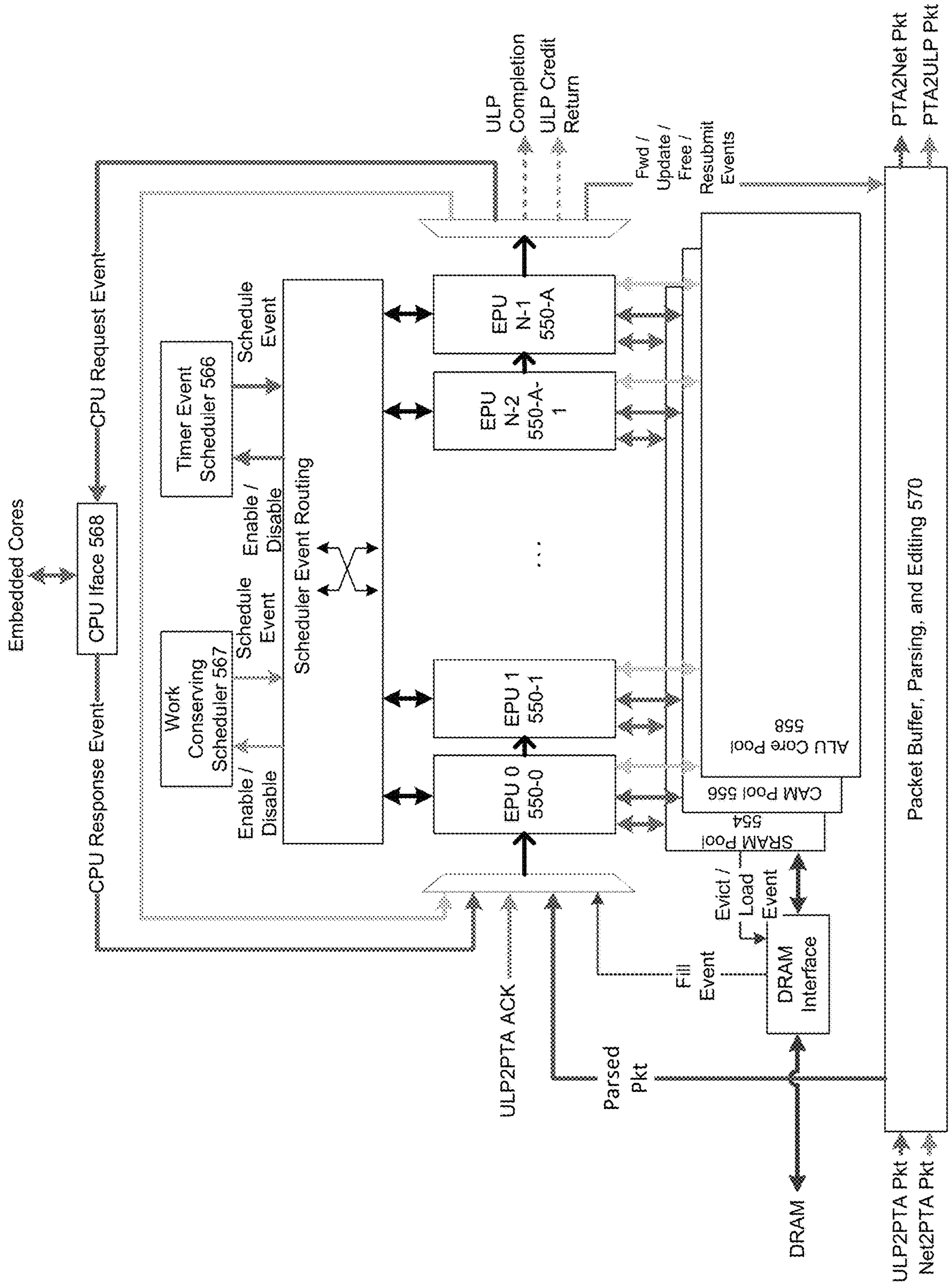
FIG. 6 depicts an example of PTA system.

FIG. 6 depicts an example Programmable Transport Architecture (PTA) designs. The system can include a set of data plane event processors, some of which are programmable event processing units (EPUs) and some of which are fixed-function event processors. The system can include infrastructure to route events between event processors. For example, PTA can replace a fixed function device or devices that perform transport protocols in a network interface device.

A developer can program PTA by defining an event graph. An event graph can represent stateful data plane operations as a data flow graph in which nodes perform event processing and edges indicate how events flow between the nodes. For example, an event graph can represent operations of a transport protocol. Multiple event graphs may be compiled and loaded onto PTA simultaneously in order for PTA to run multiple transport protocols at the same time.

RDMA PE can provide inputs to a multiplexer of a metadata and associated packet to be transmitted (e.g., ULP2PTA Pkt) as well as acknowledge (or negatively acknowledge) successful processing of packets that PTA delivered (e.g., ULP2PTA ACK) and received packet and associated metadata that an ingress pipeline delivers to PTA (e.g., Net2PTA Pkt).

In some examples, PTA includes a pipeline of one or more programmable Event Processing Units (EPUs) 550-0 to 550-A. EPUs can be organized as a pipeline such that events produced by one EPU flow to the subsequent EPU in the pipeline. EPUs 550-0 to 550-A can include programmable event processing engines that perform memory accesses, while enforcing atomicity when required. EPUs 550-0 to 550-A can include hardware to perform atomic memory accesses. EPUs 550-0 to 550-A can process data-plane events according to a user-specified event processing program. An EPU can process events (e.g., a collection of metadata) and may produce zero or more new events. The user-specified packet processing program can specify operations of a transport protocol. In some designs, an EPU can be statically assigned memory and compute resources from ALU core pool, SRAM pool, and/or CAM pool at program compilation time.

An EPU can include programmable and reconfigurable circuitry, used to implement a user-defined node in an event graph, such as by a CSP or tenant. An EPU can receive an incoming event, retrieve memory entries corresponding to that event, and dispatch event and memory data to a programmable compute engine. The programmable compute engine can execute a program to modify the event and memory data. The programmable compute engine can update event and memory entries before the event is passed to the next node. In some examples, compute circuitry (e.g., circuitry to update event metadata and/or memory data) can be included within a EPU or disaggregated in a global pool of compute resources. A programmable compute engine may be integrated into an EPU or may be located in a disaggregated resource pool that is shared across multiple EPUs. The programmable compute engine may be implemented as a pipeline of configurable ALUs, as shown in FIG. 2A, or may be implemented as programmable core, as shown in FIG. 2B.

In some examples, an EPU can process up to one event per clock cycle, or other numbers of events per clock cycle. An EPU can simultaneously bypass one or more events per clock cycle that are to be passed through the EPU (to forward one or more events to one or more different EPUs). PTA may leverage an event switch to route events between one or more event processors.

Memory and compute pools available to EPUs 550-0 to 550-A can include: SRAM pool 554 and CAM pool 556 for exact-match table lookups of connection contexts, and ALU core pool 558 to perform data plane event processing. One or more processors in ALU core pool 558 can be allocated to each EPU to perform data plane event processing. An ALU core can execute VLIW instructions for bitmap operations to evaluate Boolean expressions, and other compute tasks.

SRAM pool 554 can include a pool of SRAM or other memory resources that are statically assigned to EPUs at program compilation time based on memory requirements defined in the program. In order to avoid synchronization issues, an SRAM can be assigned to at most one EPU (e.g., multiple EPUs may be prevented from accessing the same SRAM simultaneously). SRAMs can store protocol state such as per-connection state for cached connections.

CAM pool 556 can include CAM resources that can be statically assigned to EPUs at program compilation time based on memory requirements defined in the program. In order to avoid synchronization issues, a CAM can be assigned to at most one EPU (e.g., multiple EPUs may be prevented from accessing the same CAM simultaneously). CAMs can be used to implement exact match tables to map a unique connection ID to a connection cache index.

ALU core pool 558 can include a pool of VLIW processors to process event and memory data with very low latency (e.g., a dozen clock cycles). A core can be statically assigned to an EPU when the event graph program(s) are compiled and loaded onto PTA. Cores can assigned to one or more EPUs based on the compute requirements of the event graph program(s).

DRAM interface 552 can process events related to caching and can fetch and evict protocol state between local SRAM (e.g., SRAM pool 554) and off-chip DRAM. DRAM interface 552 can implement protocol state caching. For example, DRAM interface 552 can process events to evict the necessary connection state from SRAM into DRAM, as well as to load connection state from DRAM into SRAM. DRAM interface 552 can generate a cache fill event to be processed by the EPUs once a cache load is complete.

Tx scheduler 560 may schedule packet transmission amongst the system's transmit queues. Rx scheduler 562 may schedule delivery of packets to the upper layer processor (ULP) from the system's receive queues (or reorder queues). ULP can provide an interface to an application (e.g., virtual machine (VM), container, process, microservice, and so forth) running on a host server. For example, the RDMA ULP can implement an InfiniBand (IB) Verbs interface to applications. Other ULPs can implement other application interfaces (e.g., sockets, Message Passing Interface (MPI) send/receive, Remote Procedure Call (RPC) request/response, etc.)

Miss queue (Q) scheduler 564 can make configurable hierarchical scheduling decisions for packets that experienced connection cache misses. Miss Queue Scheduler 564 may schedule packets from miss queues, which store packets that experienced a connection cache miss until the connection state is loaded from DRAM. Schedulers can maintain an amount of state to track which queues (e.g., TX queues, RX queues, and miss queues (not shown)) are eligible for scheduling. TX scheduler 560, RX scheduler 562, and miss queue scheduler 564 can implement a configurable, hierarchical scheduling policy to generate scheduling events for associated queues. Scheduling eligibility of various queues may be updated upon processing events that are generated by the EPUs.

Timer event scheduler 566 can include a configurable scheduler used to schedule events based on time. Timer event scheduler 566 can be configured to generate an event periodically for cached connections that have the event enabled, which can be useful for initiating timeout-based packet retransmissions, implementing ACK coalescing, or other time-based tasks. Timer event scheduler 566 can be configured to generate an event periodically for cached connections that have the event enabled. For example, timer event scheduler 566 can initiate timeout-based packet retransmissions, implement ACK coalescing, or other time-based tasks. In some examples, timer event scheduler 566 can support multiple timer event types (per cached connection).

Work conserving scheduler 567 can arbitrate among events for events arising from packet transmit (TX) queues, packet receive (RX) queues, or miss queues. Work conserving scheduler 567 can select events among multiple different classes of events based on configured scheduling policy (e.g., weighted round robin, round robin, strict priority, or others). Work conserving scheduler 567 can schedule events in a work conserving manner to attempt to keep EPUs busy.

CPU interface 568 can implement a shared memory queue interface with software running on one or more general purpose processors or embedded cores. Software running on the embedded cores can implement a congestion control algorithm such as Swift, HPCC, or algorithm defined by the CSP or tenant. Software can produce response events which may indicate updated congestion control parameters (e.g., congestion window, transmission rate, etc.). The embedded cores may also run control plane software to handle connection setup, exception processing, etc. For example, a control plane executed on a network interface device and/or host server can manage the data plane running in PTA to cause connection setup, handle runtime errors, etc.

Packet buffering, parsing, and editing 570 can store packet data and metadata until it is no longer needed. For instance, until the remote host ACKs the pkt and it no longer needs to be retransmitted. For example, a packet can be stored until it is explicitly freed by an EPU-generated event (e.g., after the packet has been successfully delivered to the remote host or local ULP).

PTA system can provide outputs of: packet and metadata that PTA delivers to an egress pipeline for transmission (e.g., PTA2Net Packet); packet and metadata that PTA delivers to the ULP (e.g., PTA2ULP Packet); completion messages to the ULP upon successful (or unsuccessful) delivery of packets to the remote host (e.g., ULP Completion); and return flow control credit to the ULP (e.g., ULP Credit Return). Outputs from PTA system can be provided to an egress pipeline or ULP.

Figure 7:
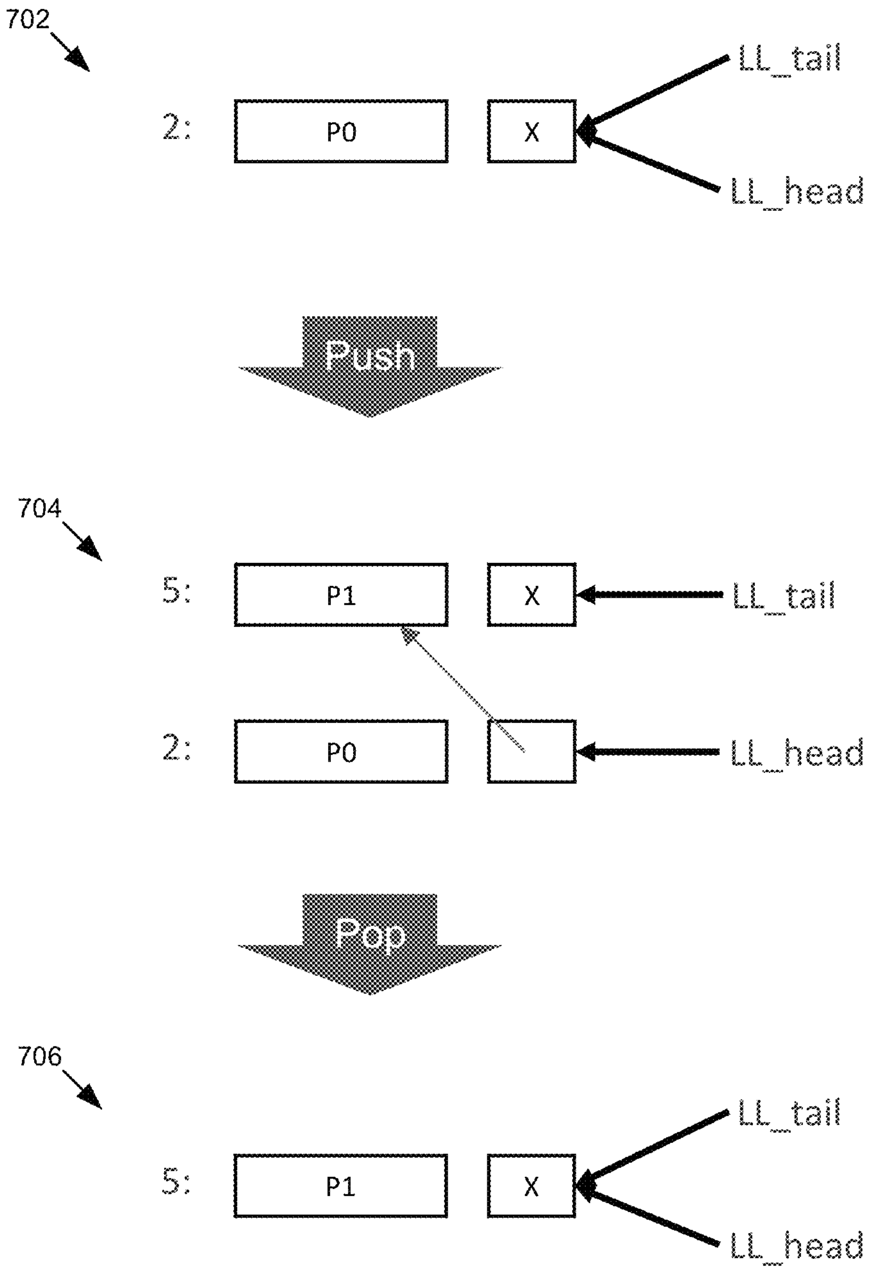
FIG. 7 depicts an example of a linked list memory access pattern.

FIG. 7 depicts an example of a linked list memory access pattern. A linked list can be represented with a single entry. A tail pointer can point to a next node to fill out when the next item is pushed onto the back of the list. For example, in 702, nodes used to build the linked list can be dynamically allocated as needed with a free list to pass out available memory handles. In order to push a new entry onto the linked list, in 704, two memory addresses can be written (e.g., new linked list node and updated tail pointer). To perform two sequentially dependent memory reads when popping the head entry off the linked list, in 706, the head pointer can be fetch, and then the node that the head pointer points to can be fetched in order to move the head pointer forward. PTA pipeline architecture can support access and modify linked lists. Developers can write programs that can push to either the front or back of a linked list, or implement a go-back-N queue, such as used in a RoCE implementation.

Figure 8:
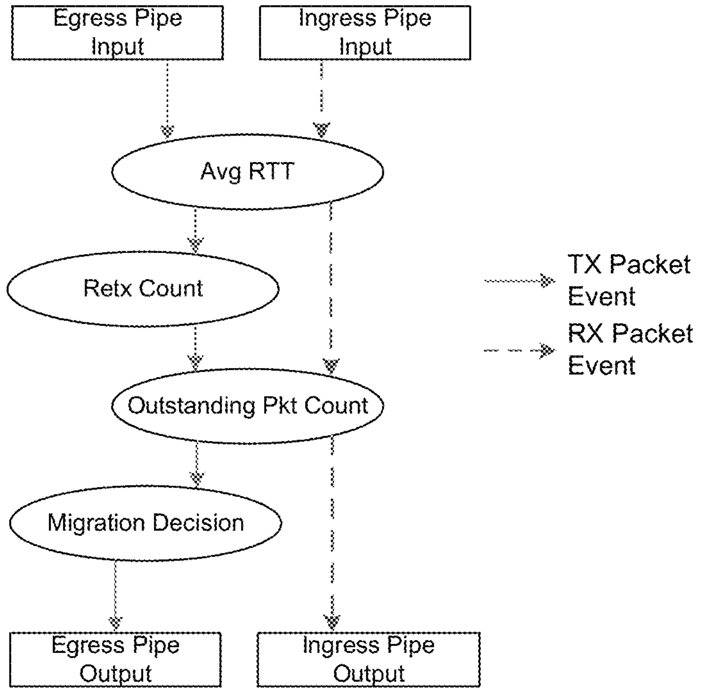
FIG. 8 depicts examples of event graph abstractions to monitor and control packet processing in a network interface device.
Figure 8:
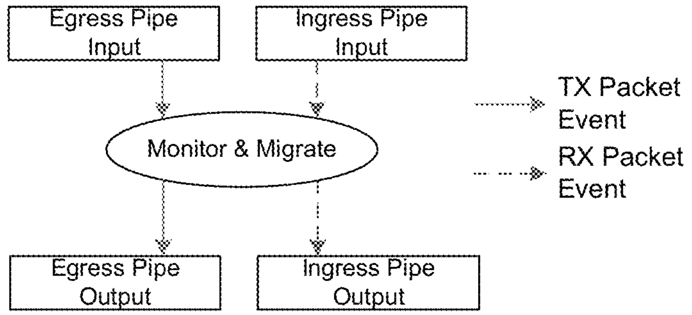

FIG. 8 depicts examples of event graph abstractions to monitor and control packet processing in a network interface device. For four fixed-function event processing nodes, described later, a developer can then implement an event graph for this architecture to monitor and influence packet processing in the NIC device.

For example, event processing nodes can include one of more of the following. Egress Pipe Input can produce a TX Packet Event for an outbound packet being transmitted by the network interface device and initializes event metadata fields upon event generation (e.g. connection ID, packet sequence number). Egress Pipe Output can consume a TX Packet Event which includes control metadata fields that can be set by user-defined nodes in the event graph to affect subsequent processing of the packet in the NIC's egress pipeline.

Ingress Pipe Input can produce an RX Packet Event for each inbound packet received by the NIC over the network and initialize event metadata fields upon event generation. Ingress Pipe Output can process an RX Packet Event which includes control metadata fields that can be set by user-defined nodes in the event graph to affect subsequent processing of the packet in the NIC's ingress pipeline.

For example, functionality can include: track an average RTT for each connection (conn.avg_rtt) as well as acknowledgement packets contain timestamp values that can be used to compute RTT measurements for a connection and use these timestamps to compute an instantaneous RTT measurement and update an exponentially weighted moving average RTT for the connection. For example, functionality can include track the number of retransmitted pkts for each connection over a recent window of time (conn.retx_count). TX Packet Event metadata indicates if the outbound packet is a retransmission and a current clock time. The number of packet retransmissions can be counted for each connection within a configurable window of time. The count can be reset when moving to a new time window. The total number of outstanding packets across connections at the host (total_outstanding_pkt_count) can be tracked.

A global state variable that is shared across connections (total_outstanding_pkt_count) can be tracked. The total_outstanding_pkt_count can be increment for each new (non-retransmission) TX packet or decremented when processing ACKs from the network. For example, the following pseudocode can be applied to detect congestion and potentially change a network path for packets. Operations can be split across multiple user-defined nodes.

```
if (conn.avg_rtt > TARGET_RTT && conn.retx_count > RETX_THRESH):
  if (total_outstanding_pkt_count > PKT_COUNT_THRESH):
    // The host is heavily loaded.
```

-continued

```
    // Tell Egress Pipe to migrate the connection to a new host.
    tx_pkt.migrate_host = true
else:
    // Tell Egress Pipe to try using a different network path.
    tx_pkt.migrate_path = true
```

Figure 9:
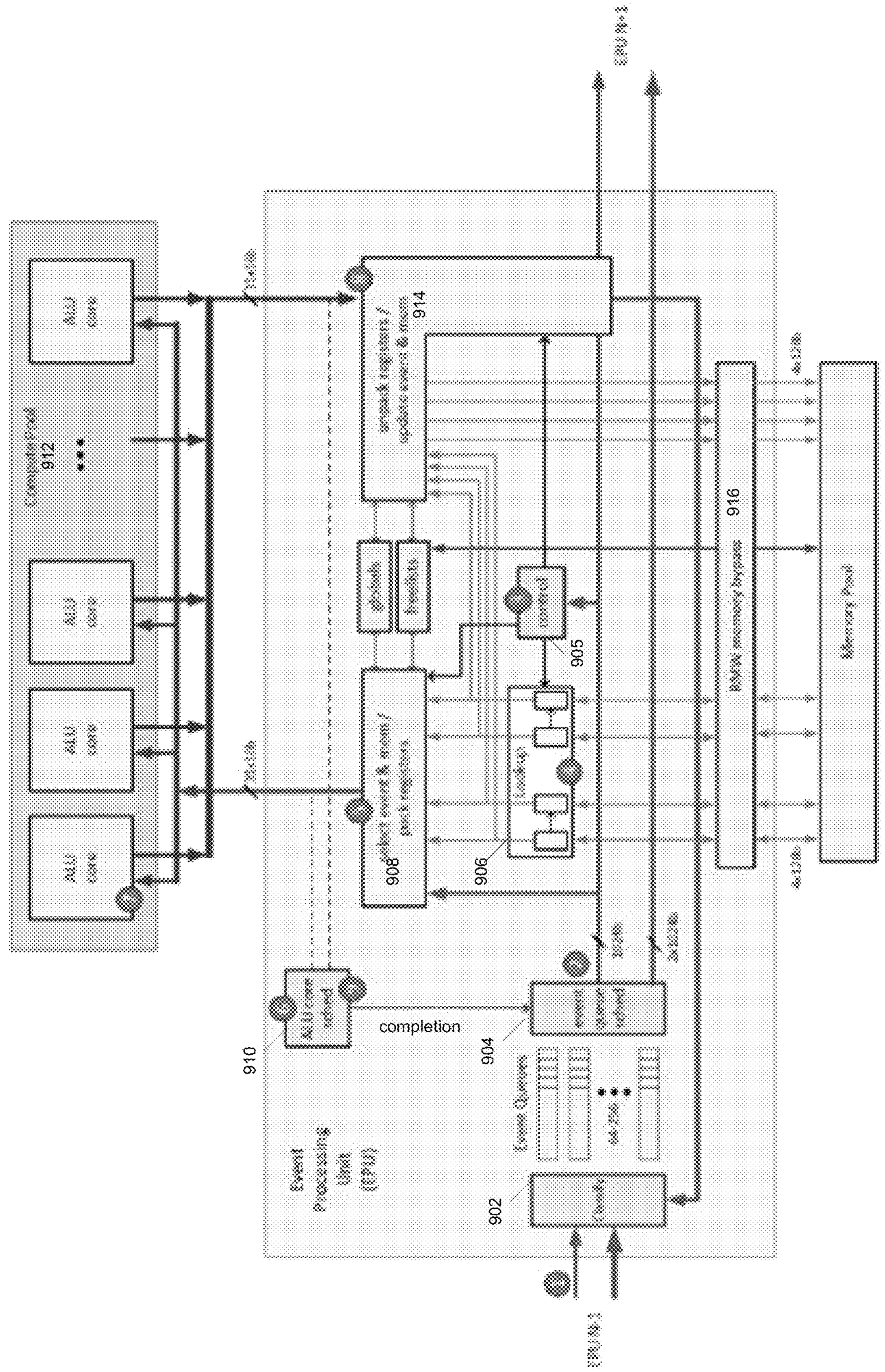
FIG. 9 depicts example operations of an Event Processing Unit (EPU).

FIG. 9 depicts an example EPU and example event processing operations. Events arriving at the EPU can be queued in bins according to their Ordering Domain Identifier (ODID), which can distinguish and transport connections (e.g., classify 902), so that events for a connection are processed in order. Events with the same ODID can be assigned to a same input queue, and processed in order of receipt. Events with different ODID that fall in the same bin can share a queue, and hence may delay one another due to head-of-line blocking. A number of bins (queues) can be chosen so that head-of-line blocking does not materially degrade the overall performance of the EPU.

Events in event queues may be scheduled (e.g., event queue scheduler 904) in round-robin, weighted round-robin, or other order (e.g., first-on-first out). Groups of queues may be given higher weighting or priority in the scheduler, e.g., ODID ranges can be used to represent different protocols with different priority. Events to process can be chosen from those at the head of an input queue, that do not have another event of the same ODID currently being processed in the same EPU, and that are not marked for bypass. Events to bypass can be scheduled for processing in a similar manner, except that they are marked for bypass. An event can be marked for bypass if its Bypass Count (BC), set in the last processing node, is nonzero. A BC can be decremented after every bypass. There could be multiple bypass schedulers, a bypass scheduler can choose a bypass event per cycle and potentially process separate groups of queues.

Event queue scheduler 904 can schedule processing of events to enforce atomic state updates. For example, an EPU may wait to process an event belonging to an ODID until the previous event belonging to the same ODID is complete.

Control 905 can store rules to configure other blocks within the EPU to process an event. Control 905 can include a CAM table that matches on the event type and other event metadata. Table entries can be configured at program compilation time and indicate event processing configuration information such as one or more of: Table ID to access (if any); for direct index tables, which event metadata field to use as the table index; for exact match tables, which event metadata field(s) to use as the table key; whether a second table access is required and if so, the table ID to access and which event metadata field or table 1 entry field to use as the index for second table 2 (e.g., memory access to another table in a linked list to be used by lookup 906); starting program counter (PC) that the ALU core should use to process this event; which event metadata fields to pack into registers; which table entry fields to pack into registers; how to update table entry from final register state; and/or how to update event metadata from final register state.

Lookup 906 can fetch memory entries from a memory pool. Some memory entries may be directly indexed by the ODID, or by another table index carried in the event. Some memory entries may be accessed via chained lookups whereby an index extracted from a looked-up entry may be used for a further lookup in a different table to access a data structure such as a linked list. Lookup 906 can support at least two chained lookup operations, such as, lookup to table A gives the index of table B to lookup. This feature can support a memory access pattern of linked lists. Lookup can support prefetching of table entries, such as reading ahead to the next entry in a linked list.

Register packing 908 can pack or load event metadata fields and table entry fields into the register slots that can be dispatched to an ALU core for processing. Register packing 908 can perform register packing using configuration information provided by control block. Register packing 908 can dispatch the packed registers and starting program counter to an ALU core based on instruction from ALU core scheduler.

ALU core scheduler 910 can determine how to dispatch events to ALU cores for processing. ALU core scheduler 910 can be configured with a set of cores that are assigned to the EPU at program compilation time. ALU core scheduler 910 can track status of whether one or more ALU cores are idle or busy. If a core is busy, ALU core scheduler 910 can track the ODID corresponding to the event that the core is processing. When a new event is ready for processing (e.g., after the registers have been packed), ALU core scheduler 910 can select an idle core and instruct register packing module to dispatch the event to the selected core. A core can indicate when event processing is complete and the core scheduler instructs the core when to dispatch its final register state to register unpacking module. ALU core scheduler can provide a completion indication back to event queue scheduler 904 indicating that another event can be scheduled with a same ODID.

One or more ALU cores in compute pool 912 can include a processor to complete calculations in an event graph node. ALU core can include partitionable ALU with VLIW dispatch; capable of a wide (64b) operation or multiple narrow (16/32b) operations in a single cycle; support Boolean expressions (e.g., complex expressions on up to 8 input bits (which may be any 8 bits from any registers) calculable in a single cycle; perform bitmap handling (e.g., find-first-zero, set/clear of individual bits on wide bitmaps); perform single-cycle load and unload of threads (event nodes); and so forth.

Register unpacking circuitry 914 can use the final register state provided by the ALU core to: (1) update one or more table entries, (2) update event metadata, (3) update global, freelist, and policer states. After updating event metadata, register unpacking circuitry 914 can forward the event to the next EPU. Register unpacking circuitry 914 may update the event's ODID and/or bypass count before forwarding the event. Register unpacking circuitry 914 can also resubmit the event back into the current EPU's input event queues for additional processing if needed.

Read-Modify-Write memory bypass 916 can provide a write-through cache for table entries. Read-Modify-Write memory bypass 916 can store recently accessed table entries so that they can be accessed again with lower latency than would otherwise be if the table access reached the memory pool.

Globals and freelists can store state that may need to be accessed and updated atomically between events (e.g., across ODIDs). Globals can support N state variables, which can be accessed and updated using a set of opcodes (e.g., increment or decrement). Freelists block can support N freelists, which are initialized at compile time. Freelists can be used to, for example, assign unique IDs to packets to maintain per-outstanding-packet state and/or dynamically allocate/deallocate data structure nodes (e.g., linked list nodes). Freelists can support a small set of opcodes to push and pop entries.

The following paragraphs describe how an EPU may be used to implement an example user-defined node in an event graph. An EPU can implement a user-defined node that performs two tasks: (1) assigns PSNs to outgoing request packets, and (2) keeps track of the total number of outstanding packets. This node will process 2 types of events: kUlpRequest—Corresponds to an outgoing request packet and kNetAck—Corresponds to an ACK packet received from the network. ACK packets cumulatively acknowledge packets up to the PSN indicated in the ACK packet.

Pseudocode for the event processing logic implemented by this node is shown below.

with Ordering Domain Identifier (ODID)=connection cache index. Classifier 902 can assign the event to an input event queue based on a hash of the ODID.

At (2), event queue scheduler 904 schedules an event for processing. The event queue scheduler schedules the event for processing after ensuring that there are no other events with the same ODID currently being processed by the EPU.

At (3), control 905 can determine an EPU control configuration by event type and metadata. Control 905 can look up the rules for processing the event based on the event type. Control 905 can instruct lookup 906 to issue a read for table conn_state_at index event→conn_cache_idx and inform register packing 908 how to pack the event metadata and table entry data into ALU core registers, as well as the starting program counter (PC) for the ALU core. Control 905 can instruct register unpacking 914 how to use the final ALU core register state to update the event metadata and table entry.

Example User Node Logic

```
EventList HandleEvent(uint32_t event_type, EventData* event) {
  // List of events to generate upon processing this event.
  // gen_events is initialized as an empty list.
  EventList gen_events;
  // Lookup connection state.
  auto& context = conn_state_[event->conn_cache_idx];
  switch (event_type) {
    case kUlpRequest: {
      // Assign PSN and update total outstanding pkt count.
      event->psn = context.request_psn;
      context.request_psn++;
      num_outstanding_pkts_++;
      event->num_outstanding_pkts = num_outstanding_pkts_;
      gen_events.push_back(event_type);
      break;
    }
    case kNetAck: {
      if (event->psn > context.oldest_outstanding_psn && event->psn < context.request_psn) {
        // Compute the number of pkts ACKed by this pkt.
        uint32_t num_pkts_acked = event->psn − context.oldest_outstanding_psn;
        context.oldest_outstanding_psn = event->psn;
        num_outstanding_pkts -= num_pkts_acked;
      }
      event->num_outstanding_pkts = num_oustanding_pkts_;
      gen_events.push_back(event_type);
      break;
    }
    default:
      break;
  }
  return gen_events;
}
```

In the above example, conn_state_is a table that maintains connection state and is indexed by an event metadata field called conn_cache_idx. It is assumed that a previous EPU computed the connection cache index (conn_cache_idx) for this event and recorded the value in the event metadata. An entry of the conn_state_table can include two state variables: request_psn (e.g., indicates the PSN to assign to the next outgoing request packet), and oldest_outstanding_psn (e.g., tracks the oldest PSN that has not yet been acknowledged). Variable num_outstanding_pkts_is a global state variable that is shared across connections and can indicate a total number of outstanding (e.g., transmitted but not yet acknowledged) request packets.

An example of operations of an EPU can be as follows. At (1), classify classifies an arriving event from another EPU or the current EPU into an event queue. A kUlpRequest event arrives at the EPU. In this case, the event is tagged At (4), lookup 906 can perform lookup of table entry(s) for the event. Lookup 906 can issue a read to the conn_state_table at index event identified by conn_cache_idx. Upon completing the read, lookup 906 can forward the table entry to the register packing module.

At (5), select event and memory/pack registers 908 can load table entry(s) and event metadata into registers for processing. For example, table entry(s) and event metadata can be loaded into 31 16 bit registers. Table entry(s) can include protocol state (e.g., connection context). Register packing 908 can pack part of the conn_state_table entry (e.g., request_psn, which is 32-bits) into two 16-bit register slots.

At (6), ALU core scheduler 910 can select an ALU core to perform processing of the event. ALU core scheduler 910 can select an ALU core to dispatch the event to. Upon core selection, ALU core scheduler 910 can instruct the register packing module to dispatch the packed registers as well as starting PC to the selected core.

At (7), the selected ALU core can execute a routine and/or perform a fixed function operation to process the event. Examples of events are described herein and can be specified by a developer or CSP or CoSP administrator. The packed registers can be loaded into the register file of the selected ALU core which then executes the program indicated by the starting PC. In this example, the ALU core can execute a sequence of instructions that record the PSN to assign to the packet, increment the request_psn, load an opcode into the register file that defines how to update num_outstanding_pkts_global state, and set a control & status register (CSR) indicating that the program is complete.

At (8), register contents can be used to update event data and table entry(s). ALU core scheduler 910 can identify that the core has finished processing the event and instruct the core to dispatch its final register state to register unpacking 914. Register unpacking 914 can issue the write to update the conn_state_table with the new request_psn value from the register state, issue the provided opcode to the globals module to increment the num_outstanding_pkts_state, copy the packet PSN from the register state to the event metadata, copy the final value of the num_outstanding_pkts_state into the event metadata, and forwards the updated event metadata to the next EPU.

At (9), another event with a same ordering domain ID can be dispatched from the event queues for processing. In some examples, an atomicity guarantee can be achieved for accesses to protocol state. After register unpacking module has issued the write to update the conn_state_table, ALU core scheduler 910 can deliver a completion to the event queue scheduler which enables it to schedule another event with the same ODID (e.g., another event that accesses the same conn_cache_idx in the conn_state_table).

To attempt to make efficient use of memory bandwidth and compute resources, EPU can decouple memory accesses and compute resources and uses specialized hardware to schedule each separately. EPU makes efficient use of memory bandwidth by carefully scheduling events to process that are not in danger of a read/write hazard. It is also optimized for memory access patterns that are common amongst stateful data plane applications; namely, simple table lookups and short, bounded linked list traversals. The EPU memory lookup engine can be configured to prefetch linked list nodes in order to enable high performance operations on the data structure.

ALU cores may not support instructions to load data from memory, which means they never need to stall waiting for a load to complete. The memory accesses associated with processing an event are performed before a thread is launched to process the event. This means the core can focus solely on issuing compute instructions to process an event while, at the same time, dedicated hardware issues memory accesses for other events.

In many stateful data plane applications, events belonging to a single flow (e.g. a single transport connection) need to access the same set of state variables. In order to maximize the rate at which events from a single flow can be processed and reduce Read-Modify-Write latency overhead, the EPU attempt to reduce the latency overhead of the read-modify-write loop. In order to do this, the EPU design may not allow tables to be shared across EPUs to avoid the need to arbitrate for table access and makes the access latency more predictable and use a cache of recently accessed (or prefetched) table entries.

In order to support a large class of stateful data plane applications, compute operations that are used to update event data and memory data can be programmable. In order to enable this, the ALU cores use a set of simple RISC instructions that are not specific to a particular application. In addition, the EPU supports a set of instructions to manipulate global state that can be applicable across various data plane applications.

EPU may not include its own local/dedicated compute and memory resources, but utilize a pool of resources allocated based on the compute and memory parameters of the program being implemented. An EPU may not be provisioned with compute and memory resources required for a worst case node.

Figure 10:
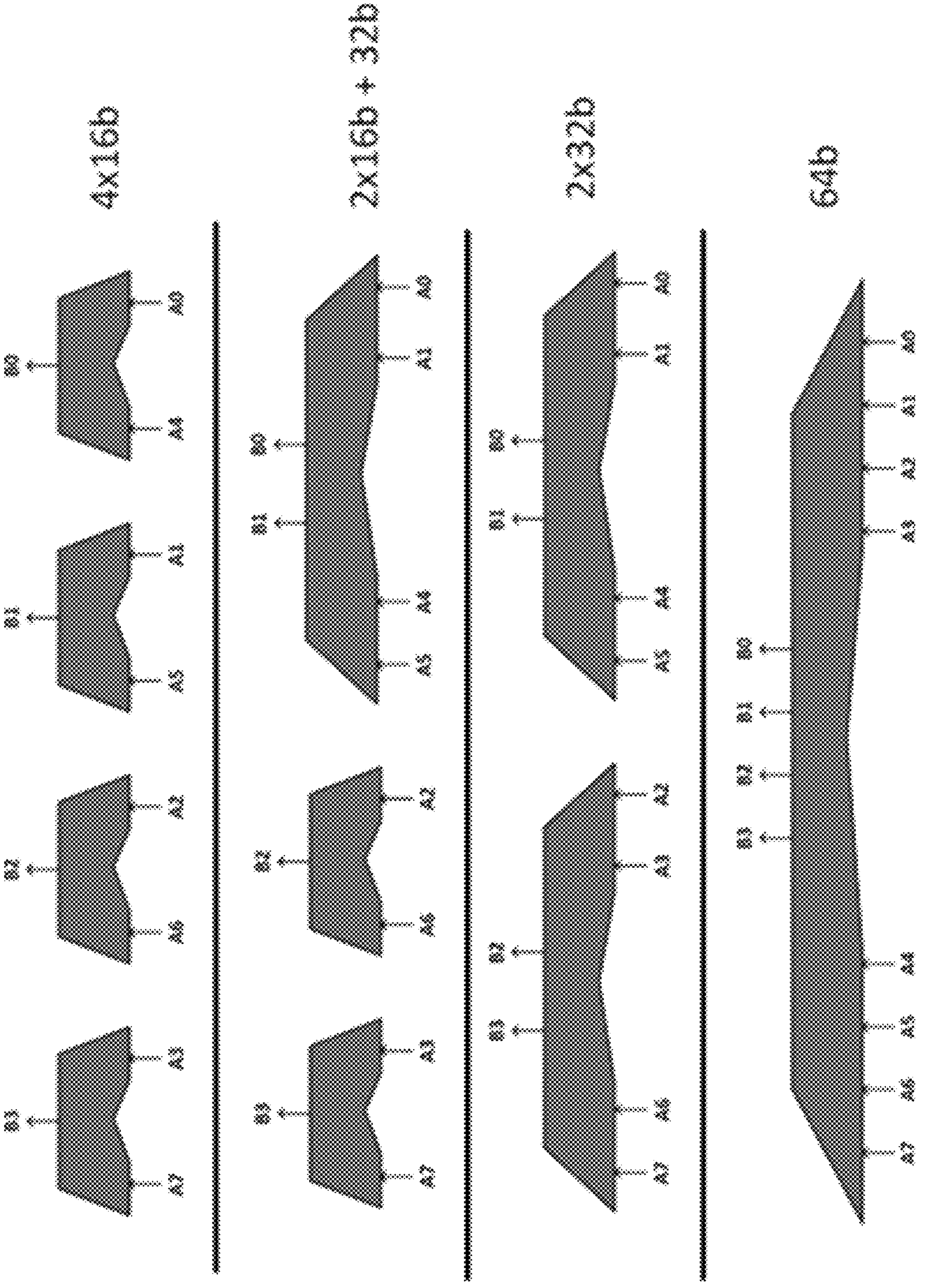
FIG. 10 depicts example VLIW partitions of an ALU used for event processing.

FIG. 10 depicts example configurations of a VLIW ALU in an ALU core. For example, FIG. 2B depicts an example of an ALU core. The ALU has 4 16b-wide slots, that can operate separately or be combined to perform a single 64b operation, two 32b operations, or 2×16b+32b. Larger values can be stored across multiple registers. A slot can include separate A* and B* ports: two A* inputs, one B* output. ALU slots can share X and Y ports and instructions that use the X and Y ports can use or set only a subrange of the X and Y registers to avoid conflict. ALU slots that are combined can receive the same or compatible instructions. If they receive incompatible instructions (e.g., add in one slot, and shift in another), the result can be unspecified. ALUs can perform single-cycle load and unload of threads.

The following provides an example of PTA ALU core instruction set.

| Instruction | Example Description |
|---|---|
| Add2 | Add or subtract 2 inputs (16 b/32 b/64 b), carry-in/carry-out |
| Add4 | Add or subtract 4 inputs (16 b/32 b), carry-in/carry-out |
| FindFirstBit | Find first 1/0 in input (16 b/32 b/64 b), efficiently chain results for large bitmaps |
| Shift | Left Logical Shift, Right Logical Shift, Right Arithmetic Shift |
| Select | Conditional move, B := (X[select]) ? AL:AH |
| SubwordSelect | Select subset of 16 b source reg and write to destination reg |
| SubwordWrite | Write subset of 16 b reg with 0's or 1's |
| Bitwise | Multiple possible bitwise operations |
| Boolean | Multiple possible Boolean operations, source bits can be anywhere, results can be chained across ALU slots |
| LoadConstant | Load 16 b constant into register |
| Branch | Conditional branch |
| RegisterSelect | Compute variable index of array within register file, use in next cycle |
| Result | Promise that result will be available X cycle in future. |

Example Transport Protocol Implementations

CSPs and CoSPs can deploy datacenter transport protocols that perform reliable (or unreliable) packet delivery over the network and congestion control. Table 1 provides an example description of various transport protocol aspects.

TABLE 1

| Transport Protocol Aspect | Example Description |
|---|---|
| Connection management | Setup and teardown connections, handle exceptions |
| Reactive congestion control | Collection congestion signals from the network (e.g., ECN, RTT, queue sizes, link utilization) and react (e.g., update |

TABLE 1-continued

| Transport Protocol Aspect | Example Description |
|---|---|
| | connection's TX rate or congestion window (CWND)) |
| Proactive congestion control | Proactively schedule network transfers to avoid congestion (e.g., receiver-driven credit management) |
| Loss detection | Detect packet loss (e.g., timeouts, duplicate acknowledgements (ACKs), explicit negative acknowledgements (NAKs)) |
| Reliable delivery | Scheme to recover from packet loss (e.g., go-back-N, selective retransmissions) |
| Ordering guarantees | Enforce a particular delivery order of data within a connection |
| Scheduling and shaping and congestion control enforcement | Policy used to select which packet to transmit next and when |
| Packetization and reassembly | Convert between message streams and packets |
| Application interface | Interface to expose network IO to applications (e.g., InfiniBand Verbs, BSD sockets) |

A transport protocol can be used to deliver data between applications over a network. A transport protocol to use in a data center depends on network properties such as one or more of: buffer sizes, bisection bandwidth, round trip time (RTT), in-network support for congestion control such as Explicit Congestion Notification (ECN), in-network telemetry (INT) (e.g., Internet Engineering Task Force (IETF) draft-kumar-ippm-ifa-01, "Inband Flow Analyzer" (February 2019)), packet trimming and priority queueing and workload properties (e.g., message size distribution, burstiness, amount of incast, application message ordering requirements and performance goals).

Transport protocols that are implemented in fixed-function hardware (e.g., RDMA network interface controllers can implement a RoCE protocol) can provide high performance but may not be able to be re-designed or modified after the fixed-function hardware has been taped out.

At least to provide a flexible and configurable transport protocol, a programmable event processing architecture with scheduling circuitry, packet buffering, and processors can perform at least congestion control and reliable packet delivery. The programmable event processing architecture with scheduling circuitry, packet buffering, and processors can support of one or more of: support for packet reordering tolerance, selective retransmissions, window-based congestion control, and receiver-side congestion control. Cloud Service Providers (CSPs) can design and deploy custom datacenter transport protocols that are suited for their workloads and networks using the programmable event processing architecture. In addition, CSPs can use the platform to deploy custom data plane applications that monitor network health or host application performance, then provide useful metrics for control plane management.

A platform that provides programmability of transport protocols does not need to contain dedicated silicon for specific transport protocols. A transport protocol can be represented as a separate program and memory and compute resources can be flexibly allocated at compile time based on program requirements. CSPs can allocate a platform's resources to the set of programs to support. For example, resources need not be utilized for an Internet Wide Area RDMA Protocol (iWARP) protocol implementation if the CSP does not utilize iWARP in its network.

An upper protocol engine can provide an interface to applications. In some examples, an RDMA protocol engine can implement the InfiniBand Verbs interface and provide an interface to applications as well as the associated packetization such as splitting up a large message into maximum transmission unit (MTU) sized packets. A programmable event processing architecture with scheduling circuitry, packet buffering, and processors can then perform a configured and potentially custom reliable delivery and congestion control for packets generated by the upper protocol engine.

A programmable event processing architecture, described herein, such as PTA, can be configured to perform reliable packet delivery and congestion signal collection by analyzing packet header fields. A transport protocol's reactive congestion control algorithm (e.g., Swift, HPCC, etc.) can be implemented using programmed embedded cores. Collected congestion signals (and relevant connection state) can be sent to one or more embedded cores via in-memory mailbox queues. The cores can process congestion control events and return commands to update the connection state (e.g., congestion window (CWND) or transmission rate). A sender can adjust its transmit rate by adjusting a CWND size to adjust a number of sent packets for which acknowledgement of receipt was not received. Commands can be processed by programmable queue management to update the connection state and enforce the congestion control decisions. Programmable queue management can provide primitives to implement a wide range of queueing data structures including first in first out (FIFO) queues, go-back-N queues, or reorder queues.

Figure 11:
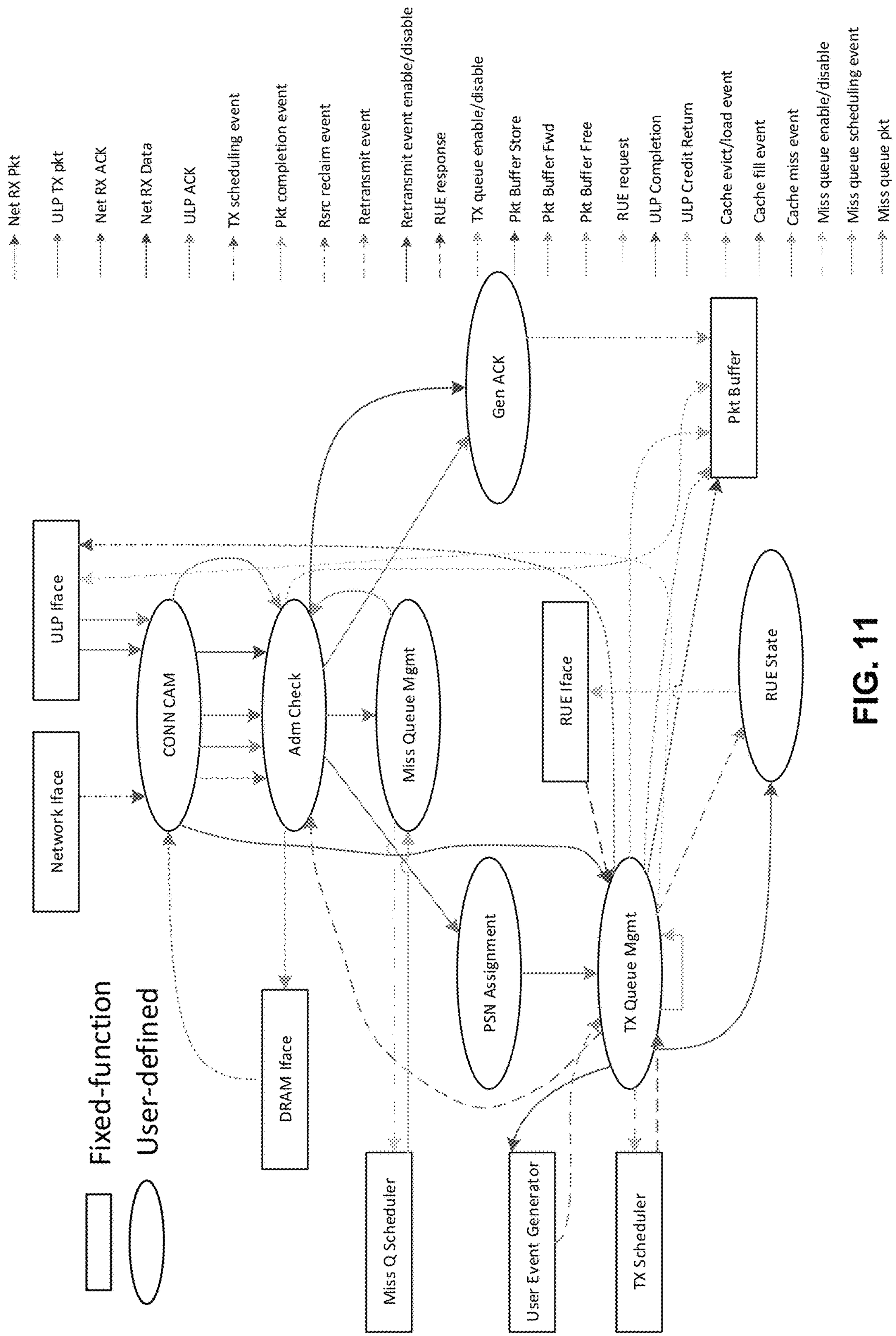
FIG. 11 shows an example event graph implementation of a version of a RoCEv2 protocol.

FIG. 11 shows an example event graph that implements a version of RoCEv2 transport protocol. Rectangles can represent fixed-function event processing nodes and ovals can represent user-defined event processing nodes. When an event graph is compiled onto PTA, operations of one or more oval can be mapped to an EPU. The programmer defined the functionality of user-defined nodes as well as the connectivity of the nodes in the event graph. For example, one or more EPUs of FIG. 6 can implement the following event processing nodes: Conn CAM, Admission Check, updating req_psn, and updating TX queues.

The following provides example event processing nodes.

Conn CAM

Maintains global state: conn_cam, e.g., an exact match table that maps connection ID to connection cache index. This table can contain at most 8K entries (e.g., 8K connections fit in the cache/on-chip SRAM).

Consumes events:

Network RX packet

Network RX ACK

ULP TX Pkt

ULP ACK

- Lookup the cache index of the corresponding connection

Cache fill event

- This event indicates that connection X has been evicted from cache index x and connection Y has been loaded into cache index x.
- Update conn_cam to map connection Y to cache index x, and delete the mapping from connection X to index x.

Generates events:

Network RX packet

Network RX ACK

ULP TX Packet

ULP ACK

- Update the event metadata to include the connection's cache index and forward the event Cache miss event This event is generated if the connection ID is not found in conn_cam Cache fill event Forward this event after processing Admission Check (and Eviction Selection)

Maintains global state:

cntr_ulp_req_tx_pkt—Counts the remaining number of packets that can be stored in the packet buffer's long-term storage (across connections).

cntr_ulp_req_tx_buf—Counts the remaining number of bytes (measured in 64B buffers) that can be stored in the packet buffer's long-term storage (across connections).

tx_pkt_id_freelist—a freelist of available long-term packet IDs.

eviction_eligibility—This is a data structure with one bit per connection cache index. A connection's bit is set if it is currently eligible to be evicted from the cache, which is true if the connection is not currently consuming any long-term resources in the packet buffer.

is_evicted—A data structure with one bit per connection cache index. The bit indicates if the connection is currently marked for cache eviction.

miss_queue_freelist—a freelist of available miss queue IDs.

Maintains the following connection cache state:

cntr_ulp_req_tx_pkt—Counts the remaining number of packets that can be stored in the packet buffer's long-term storage (for this connection).

cntr_ulp_req_tx_buf—Counts the remaining number of bytes (measured in 64B buffers) that can be stored in the packet buffer's long-term storage (for this connection).

expected_psn—The PSN of the next packet to deliver to the ULP on the Target-side.

miss_queue_size—The number of packets in the connection's miss queue.

miss_queue_id—The ID of the miss queue assigned to this connection (only valid if miss_queue_size>0)

Consumes the following events:

ULP TX Packet

Verify that there are sufficient pkt & buffer credits for this packet, check both global resource counters and the connection's resource counters.

Verify that the connection's miss queue is empty. If the miss queue is non-empty then generate a cache miss event.

Verify that the connection is not currently marked for eviction. If it is marked for eviction, generate a cache miss event If all the above checks pass, update the resource counters, pop a tx pkt ID from the tx_pkt_id_freelist. If the connection's resource counters go from zero to non-zero, then clear the connection's eviction eligibility bit.

ULP ACK

If this is a ULP ACK then forward the event

If this is a ULP NACK (negative acknowledgement) which indicates a processing error at the target ULP, then rollback the expected_psn state to the PSN indicated in the event metadata.

Network RX Packet

Verify that the packet's PSN is equal to the expected_psn. If PSN>expected_psn then the packet arrived out of order, generate a pkt buffer drop event. If PSN<expected_psn then the packet is a duplicate and we need to send an ACK now, but only ACK PSNs that have been acknowledged by the target ULP; mark pkt as duplicate and forward network RX packet event.

Verify that the connection's miss queue is empty. If the miss queue is non-empty then generate a cache miss event.

Verify that the connection is not currently marked for eviction. If it is marked for eviction, generate a cache miss event.

If the above checks pass then, increment expected_psn and forward the event

Cache miss event

If the connection's miss_queue_size>0 then update the event metadata with the miss_queue_id, increment the miss_queue_size, and forward the event If the connection's miss_queue_size==0

Pop a miss_queue_id from the miss_queue_freelist, increment the miss_queue_size

Query the eviction_eligibility data structure to identify a connection to evict from the cache. Once a connection is identified, set the corresponding is_evicted bit.

Forward the cache miss event with the selected miss_queue_id

Generate the cache evict/load event

Cache fill event

Initialize the connection's resource counters to 0

Initialize the connection's miss_queue_size state to 0

Clear the connection cache index's is_evicted bit

Resource reclaim event

Increment the global and connection resource counters

Push the provided packet ID to the tx_pkt_id_freelist

If the connection is no longer consuming any packet buffer resources, mark it as eligible for eviction Miss queue packet Decrement the miss_queue_size Process the event according to the original event type, do not send the event back to the miss queue Generates the following events:

ULP TX Packet

ULP ACK

Network RX Packet

Cache miss event

Cache fill event

Pkt buffer drop

Miss Queue Management

Maintains the global state:

miss_queue_node_freelist—a list of available miss queue nodes (addresses). There are a total of 256 miss queue nodes.

miss_queue_node_memory—stores the node data; indexed by node address miss_queue_next_ptr_memory—stores pointer to the next node in the linked list (if any)

Maintains the following per miss queue state:

Head & tail pointers for the miss queue linked list

Connection cache index associated with the miss queue (if any)

Consumes the following events:

Cache miss event

Push new node to the indicated miss queue linked list

Cache fill event

Generate event to enable scheduling of the indicated miss queue

- Miss queue scheduling event
  - Pop node from the indicated miss queue
  - Generate miss queue pkt event
  - If the queue is still non-empty, generate event to enable scheduling of the miss queue
- Generates the following events:
- Miss queue pkt
- Miss queue enable/disable PSN Assignment

- Maintains the following connection cache state:
- request_psn—the PSN to assign to the next request packet
- Consumes the following events:
- ULP TX packet
  - Assign PSN to be the current value of request_psn
  - Increment request_psn
  - Forward event
- Generates the following events:
- ULP TX packet Tx Queue Management

- Maintains the following connection cache state:
- Head, next, and tail pointers for TX queue linked list
  - Linked list pointers are tx_pkt_ids that were popped from the tx_pkt_id_freelist in the admission check node
  - Head is the oldest unacknowledged packet
  - Next is the next packet to transmit when a TX scheduling event is processed for this connection
  - Tail is the last pkt added to the queue
- Additional linked list metadata:
  - head_psn—the PSN of the packet at the head of the queue
  - head_resource_credits—the amount of resource credits consumed by the pkt at the head of the queue
  - next_psn—the PSN of the next packet to transmit from the queue
- initiator_ack_psn—the oldest unacknowledged PSN
- cwnd—the number of packets that the connection is allowed to have outstanding. Transmit the next pkt from the queue if next_psn<initiator_ack_psn+cwnd
- Maintains the following per TX pkt state (10K entries), indexed by tx_pkt_id:
- nxt_ptr—the ID of the next packet in the linked list
- nxt_psn—the PSN of the next packet in the linked list
- nxt_resource_credits—the amount of resource credits consumed by the next packet in the linked list
- Consumes the following events:
- ULP TX pkt
  - Enqueue pkt into the connection's TX queue linked list
  - If next_psn<initiator_ack_psn+cwnd, generate an event to enable the queue
  - Generate pkt buffer store event to move the pkt to long-term storage
- Network RX ACK
  - Verify that the PSN in the ACK pkt>initiator_ack_psn. If it is then update initiator_ack_psn; otherwise drop then ACK because it doesn't acknowledge any new data.
  - If initiator_ack_psn moves forward and it is now greater than head_psn, generate a pkt completion event
  - If next_psn<initiator_ack_psn+cwnd, generate an event to enable the queue
  - Record the number of pkts that are ACKed (difference between ACK PSN and old initiator_ack_psn) in the network RX ACK event metadata
- Retransmit event
  - Rollback the link list next ptr to head ptr so that we start retransmitting from the oldest unacknowledged packet
  - If next_psn<initiator_ack_psn+cwnd, generate an event to enable the queue
- TX scheduling event
  - Read the next pkt from the TX queue linked list, move the next ptr forward
  - Generate pkt buffer fwd event
  - Generate retransmit enable event
  - If next_psn<initiator_ack_psn+cwnd, generate an event to enable the queue
- RUE response
  - Update cwnd
  - If next_psn<initiator_ack_psn+cwnd, generate an event to enable the queue
- Packet completion event
  - Verify that initiator_ack_psn>head_psn
  - Pop head off the linked list, if next==head then move next forward as well
  - Generate a resource reclaim event with the old head ptr and old head_resource_credits
  - Generate a pkt buffer free event with the old head ptr
  - Generate ULP completion
  - Generate ULP credit return with the old head_resource_credits
  - If initiator_ack_psn>new head_psn, generate packet completion event
  - If new head==next, generate event to disable retransmit event because there are no longer any unacknowledged packets
- Generates the following events:
- Network RX ACK
- TX queue enable/disable
- Packet completion event
- Retransmit event enable/disable
- Retransmit event
- Packet buffer drop/store/fwd/free
- ULP completion
- ULP credit return RUE State

- Maintains the following connection cache state:
- num_acked—counter that tracks the number of pkts that have been acknowledged since the last RUE request was generated for this connection
- last_rue_request_timestamp—the time at which the last RUE request was generated for this connection
- Consumes the following events:
- Network RX ACK
  - Update num_acked counter
  - If num_acked>N or (now—last_rue_request_timestamp)>T, generate RUE request event, reset num_acked and update last_rue_request_timestamp
- Retransmit event
  - Generate RUE request
  - Reset num_acked and update last_rue_request_timestamp
- Generates the following events:
- RUE request Generate ACK

- Maintains the following connection cache state:
- target_ack_psn—the highest PSN that has been acknowledged by the ULP
- Consumes the following events:
- ULP ACK
  - Update target_ack_psn Generate pkt buffer fwd event to transmit an ACK w/PSN=target_ack_psn Network RX pkt If the pkt is marked as a duplicate, generate pkt buffer fwd event to transmit ACK with PSN=target_ack_psn If the pkt is not a duplicate, generate pkt buffer fwd event to deliver pkt to ULP Generates the following events:

Packet buffer fwd

The event graph abstraction can be used to represent a transport protocol using fixed-function and user-defined nodes. An event graph implementation can define functionality of user-defined nodes and connectivity of an event graph. Edges can represent data-plane events. The following describe examples of events.

| Event Name | Event Description | Fields | Field Size (bits) | Field Description |
|---|---|---|---|---|
| UlpCompletion | PTA generates an event of this type for the ULP to indicate that a packet, transaction, or message has been completed (possibly in error). The ULP processes these events to generate completions for the application. | qp_id | 24 | RDMA QP ID that this completion event is intended for. |
| | | ulp_cookie | 64 | Cookie that is generated by ULP on transmit. PTA returns the same cookie in completion events. |
| | | error_code | 8 | Indicates the success (0) or the type of error. |
| UlpCreditReturn | The ULP consumes flow control credit when it delivers packets to PTA and PTA generates an event of this type to return flow control credit to the ULP. | qp_id | 24 | RDMA QP ID to return flow control credit to. |
| | | request_tx_packet | 16 | Flow control credit to return to the ULP. |
| UlpTxPkt | The ULP Interface node generates this event when the ULP delivers a packet to PTA. | cid | 32 | Connection ID associated with this packet transfer. Optional field used by some transport protocol implementations. |
| | | ulp_cookie | 64 | ULP generated cookie associated with this packet. PTA returns this cookie to ULP in the completion event interface, if needed. |
| | | request_or_resp_len | 16 | Total length of the associated request or response including any ULP headers and data. |
| | | data_len | 16 | Length of ULP headers and inline data (if any). Not including SGL data. |
| | | sgl_len | 16 | Length of the associated SGL in bytes. |
| | | src_qp_id | 24 | RDMA QP ID that generated this packet transfer. |
| | | tmp_pkt_id | 16 | A temporary ID that the PTA packet buffer module assigned to this packet. Upon processing this event, PTA must either, drop the pkt, forward the pkt, or re-associate the pkt with a persistent packet ID. The number of temporary packet IDs is determined by the PTA pipeline latency and cache miss latency. |
| UlpAck | The ULP Interface node generates this | cid | 32 | Connection ID associated with this ACK event. |

-continued

| Event Name | Event Description | Fields | Field Size (bits) | Field Description |
|---|---|---|---|---|
| | event when the ULP provides an ACK (or NACK) indication to PTA. PTA processes these events to decide when it is safe to acknowledge pkts to the remote host. | | | |
| | | pta_cookie | 72 | PTA generated cookie that is returned by ULP. |
| | | ack_code | 8 | ACK or NACK error code. |
| NetRxPkt | This event is generated by the network interface node when a packet arrives over the network and needs to be processed by PTA. | tmp_pkt_id | 16 | A temporary ID that the PTA packet buffer module assigned to this packet. Upon processing this event, PTA must either, drop the pkt, forward the pkt, or re-associate the pkt with a persistent packet ID. The number of temporary packet IDs is determined by the PTA pipeline latency and cache miss latency. |
| | | headers | | Relevant header fields that are extracted from the packet. These fields are protocol specific. |
| QueueStatus | Enable or disable a connection's queues. The scheduler will only generate scheduling events for enabled queues. | conn_cache_idx | 14 | Connection cache index. |
| | | queue_valid | 8 | Bitmap indicating which connection queues to consider when processing this event. Supports up to 8 queues per connection. |
| | | queue_enable | 8 | Bitmap indicating whether to enable or disable each connection queue. 1 = enable, 0 = disable. Only consider the queues whose corresponding valid bit is set. |
| QueueMask | Mask ON or OFF one or more queues across connections. The scheduler will only generate scheduling events for queues that are masked ON. | mask_on | 1 | Boolean indicating whether to mask the indicated queues ON or OFF. |
| | | queue_valid | 8 | Bitmap indicating which connection queues to mask ON or OFF. |
| QueueSchedule | Indicates which connection and queue have been selected for scheduling. | conn_cache_idx | 13 | Selected connection cache index. |
| | | queue_valid | 8 | One-hot bitmap indicating the selected connection queue. |

-continued

| Event Name | Event Description | Fields | Field Size (bits) | Field Description |
|---|---|---|---|---|
| PktBufStore | This event is used to re-associate the packet data indicated by the provided tmp_pkt_id with the provided persistent TX or RX pkt_id. Upon processing this event, the tmp_pkt_id will be freed. | tmp_pkt_id | 16 | Temporary packet ID that is currently associated with the packet. This ID is freed upon processing the event. |
| | | pkt_id | 16 | Persistent packet ID to assign to this packet. |
| | | id_type | 1 | Indicates if pkt_id is a persistent TX or RX packet ID. |
| PktBufFwd | This event is used to forward the indicated packet to either the network or the ULP. | pkt_id | 16 | ID corresponding to the packet to forward. If this is a tmp_pkt_id, if will be freed upon event processing. |
| | | id_type | 2 | Indicates whether this event is forwarding a temporary pkt ID, TX pkt, RX pkt, or if the pkt buffer is supposed to generate a new pkt to forward. |
| | | destination headers | 1 | Either network or ULP. Header fields that the packet buffer may use to update the packet upon forwarding. These header fields are protocol specific. |
| PktBufFree | This event is used to free packet buffer space. | pkt_id | 16 | Indicates which packet data to free. |
| | | id_type | 2 | Indicates if pkt_id is a temporary, TX, or RX pkt ID. |
| TimerEventStatus | This event is used to either enable or disable the indicated timer event for the indicated connection. | conn_cache_idx | 16 | Connection cache index. |
| | | event_type | 1 | Type of timer event. Supports up to 2 timer events per connection. |
| | | enable | 1 | Enable or disable the indicated timer event for the connection. |
| TimerEvent | Generated when the corresponding timer event is scheduled. | conn_cache_idx | 16 | Connection cache index. |
| | | event_type | 1 | Type of timer event that this event corresponds to. |
| RueRequest | Indicates that an RUE request event should be generated and dispatched to the RUE for processing. | | | |
| RueResponse | RUE generated a response to be processed by the PTA event graph. | | | |
| CacheEvictLoad | Indicates that the provided cache | evict_cache_idx | | |

-continued

| Event Name | Event Description | Fields | Field Size (bits) | Field Description |
|---|---|---|---|---|
| | index should be evicted into DRAM and the provided connection ID should have its state loaded in its place. | load_cid | | |
| CacheFill | Generated after a connection's state is loaded into cache from DRAM. | | | |

An example reliable transport (RT) protocol can be performed by use of PTA. A summary of example Initiator-side logic can be as follows:

PSN increments by 1 for each TX data packet.

Go-back-N loss recovery using timeouts.

Cwnd-based congestion control.

Generate completion to ULP for each TX data packet.

A summary of example Target-side logic can be as follows:

Compare pkt.PSN to expected_PSN, increment expected_PSN for each accepted packet, drop packet if not accepted.

Generate (cumulative) ACK when ULP ACKs PSN.

Rollback expected_PSN if ULP NACKs PSN.

Figure 12:
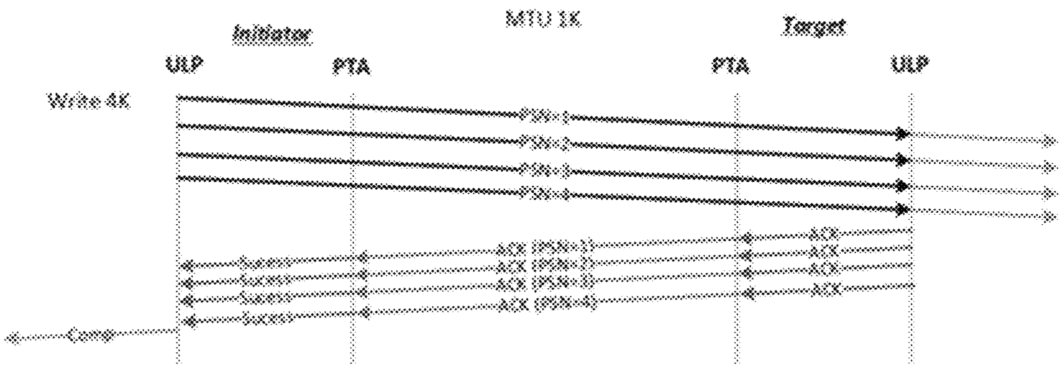
FIG. 12 depicts example flows of a reliable transport (RT).
Figure 12:
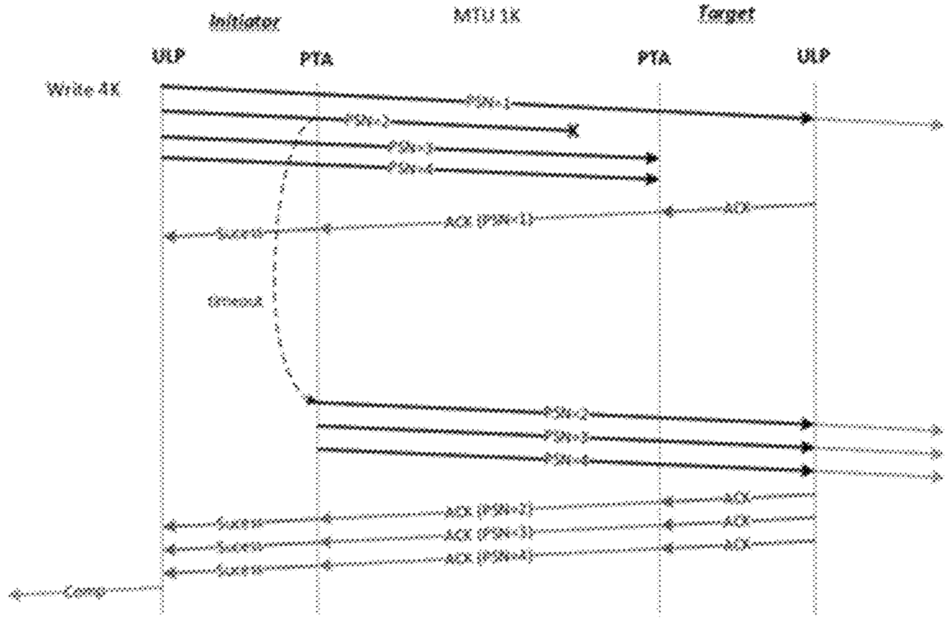

FIG. 12 depicts example flows of an RT. Reference is made to 1202 for acknowledgement of packet receipt. If an initiator ULP can generate 4 data pkts and passes them to PTA which assigns a PSN, stores the pkt in its retransmission buffer space, and forwards it into the network. The target PTA performs the expected PSN check and delivers data packets to the target ULP in order. The target ULP provides per-packet ACK (or NACK) indications back to PTA to acknowledge successful (or unsuccessful) processing of the pkt. The target PTA generates ACK packets (possibly coalesced) back to the initiator to acknowledge successful receipt of packets up to the PSN indicated in the ACK pkt. The initiator PTA processes the ACK pkts from the network and generates per-data-pkt completion indication back up to the initiator ULP, which then uses these completions to generate application-level completions.

Reference is made to 1204 for an RT loss recovery flow. In this example, PSN=2 is lost in the network. Upon receiving PSNs 3 and 4, the target PTA drops these packets because they fail the expected PSN check. Eventually, the retransmission timer expires and packets 2, 3, and 4 are retransmitted by PTA, without the involvement of the initiator ULP.

Figure 13:
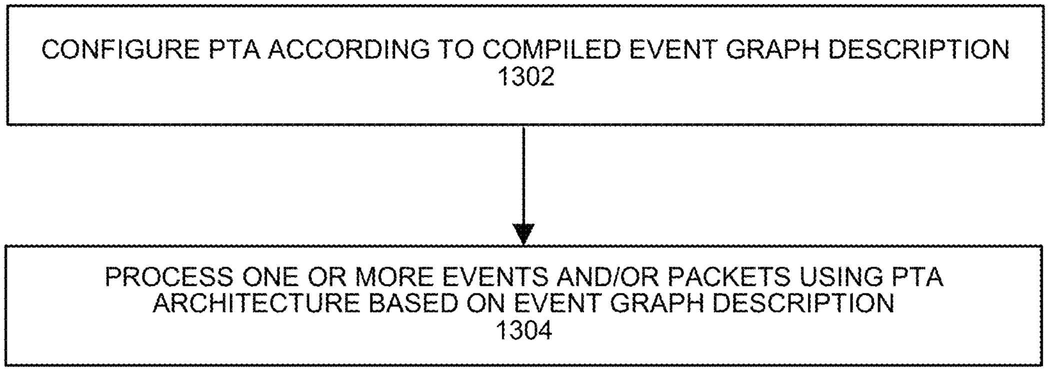
FIG. 13 depicts an example process.

FIG. 13 depicts an example process. The process can be performed by a switch in a network interface device. For example, a PTA in a network interface device can be configured to perform a transport protocol. At 1302, an event graph description with user-defined nodes can be compiled and provide to a programmable event processing architecture for performance. For example, a CSP or tenant can specify operations of a PTA based on the event graph description, such as transport protocol operations.

At 1304, the programmable event processing architecture can perform operations based on the event graph description. For example, the plurality of programmable event processors can perform memory accesses separate from compute operations. For example, the plurality of programmable event processors can group events into at least one group. For example, the plurality of programmable event processors are to enforce atomic processing of other events within a group of the at least one group. In some examples, the atomic processing includes propagation of state changes to among events of the group. In some examples, the plurality of programmable event processors are to perform parallel processing of events belonging to different groups.

Figure 14:
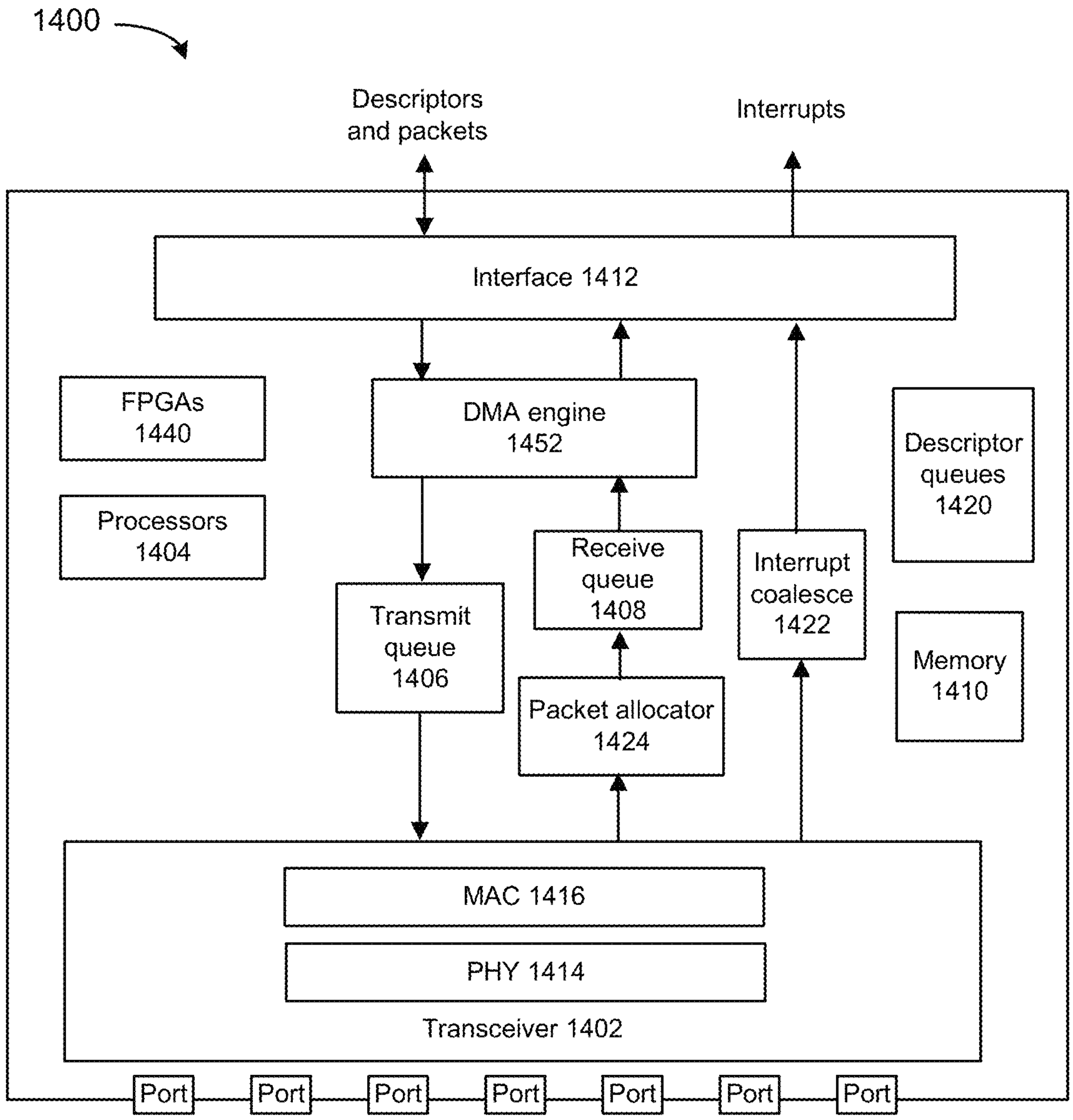
FIG. 14 depicts an example network interface device.

FIG. 14 depicts an example network interface device. In some examples, processors 1404 and/or FPGAs 1440 can include configurable processing units based on a compiled program, as described herein. Some examples of network interface 1400 are part of an Infrastructure Processing Unit (IPU) or data processing unit (DPU) or utilized by an IPU or DPU. An XPU or xPU can refer at least to an IPU, DPU, graphics processing unit (GPU), general purpose GPU (GPGPU), or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 1400 can include transceiver 1402, processors 1404, transmit queue 1406, receive queue 1408, memory 1410, and bus interface 1412, and DMA engine 1452. Transceiver 1402 can be capable of receiving and transmitting packets in conformance with the applicable protocols such as Ethernet as described in IEEE 802.3, although other protocols may be used. Transceiver 1402 can receive and transmit packets from and to a network via a network medium (not depicted). Transceiver 1402 can include PHY circuitry 1414 and media access control (MAC) circuitry 1416. PHY circuitry 1414 can include encoding and decoding circuitry (not shown) to encode and decode data packets according to applicable physical layer specifications or standards. MAC circuitry 1416 can be configured to perform MAC address filtering on received packets, process MAC headers of received packets by verifying data integrity, remove preambles and padding, and provide packet content for processing by higher layers. MAC circuitry 1416 can be configured to assemble data to be transmitted into packets, that include destination and source addresses along with network control information and error detection hash values.

Processors 1404 can be one or more of: combination of: a processor, core, graphics processing unit (GPU), field programmable gate array (FPGA), application specific integrated circuit (ASIC), or other programmable hardware device that allow programming of network interface 1400. For example, a "smart network interface" or SmartNIC can provide packet processing capabilities in the network interface using processors 1404.

Processors 1404 can include a programmable processing pipeline that is programmable by packet processing program. A programmable processing pipeline can include configurable processing units based on a compiled program, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content. Processors 1404 and/or FPGAs 1440 can include configurable processing units based on a compiled program.

Packet allocator 1424 can provide distribution of received packets for processing by multiple CPUs or cores using receive side scaling (RSS). When packet allocator 1424 uses RSS, packet allocator 1424 can calculate a hash or make another determination based on contents of a received packet to determine which CPU or core is to process a packet.

Interrupt coalesce 1422 can perform interrupt moderation whereby network interface interrupt coalesce 1422 waits for multiple packets to arrive, or for a time-out to expire, before generating an interrupt to host system to process received packet(s). Receive Segment Coalescing (RSC) can be performed by network interface 1400 whereby portions of incoming packets are combined into segments of a packet. Network interface 1400 provides this coalesced packet to an application.

Direct memory access (DMA) engine 1452 can copy a packet header, packet payload, and/or descriptor directly from host memory to the network interface or vice versa, instead of copying the packet to an intermediate buffer at the host and then using another copy operation from the intermediate buffer to the destination buffer.

Memory 1410 can be any type of volatile or non-volatile memory device and can store any queue or instructions used to program network interface 1400. Transmit traffic manager can schedule transmission of packets from transmit queue 1406. Transmit queue 1406 can include data or references to data for transmission by network interface. Receive queue 1408 can include data or references to data that was received by network interface from a network. Descriptor queues 1420 can include descriptors that reference data or packets in transmit queue 1406 or receive queue 1408. Bus interface 1412 can provide an interface with host device (not depicted). For example, bus interface 1412 can be compatible with or based at least in part on PCI, PCIe, PCI-x, Serial ATA, and/or USB (although other interconnection standards may be used), or proprietary variations thereof.

Figure 15:
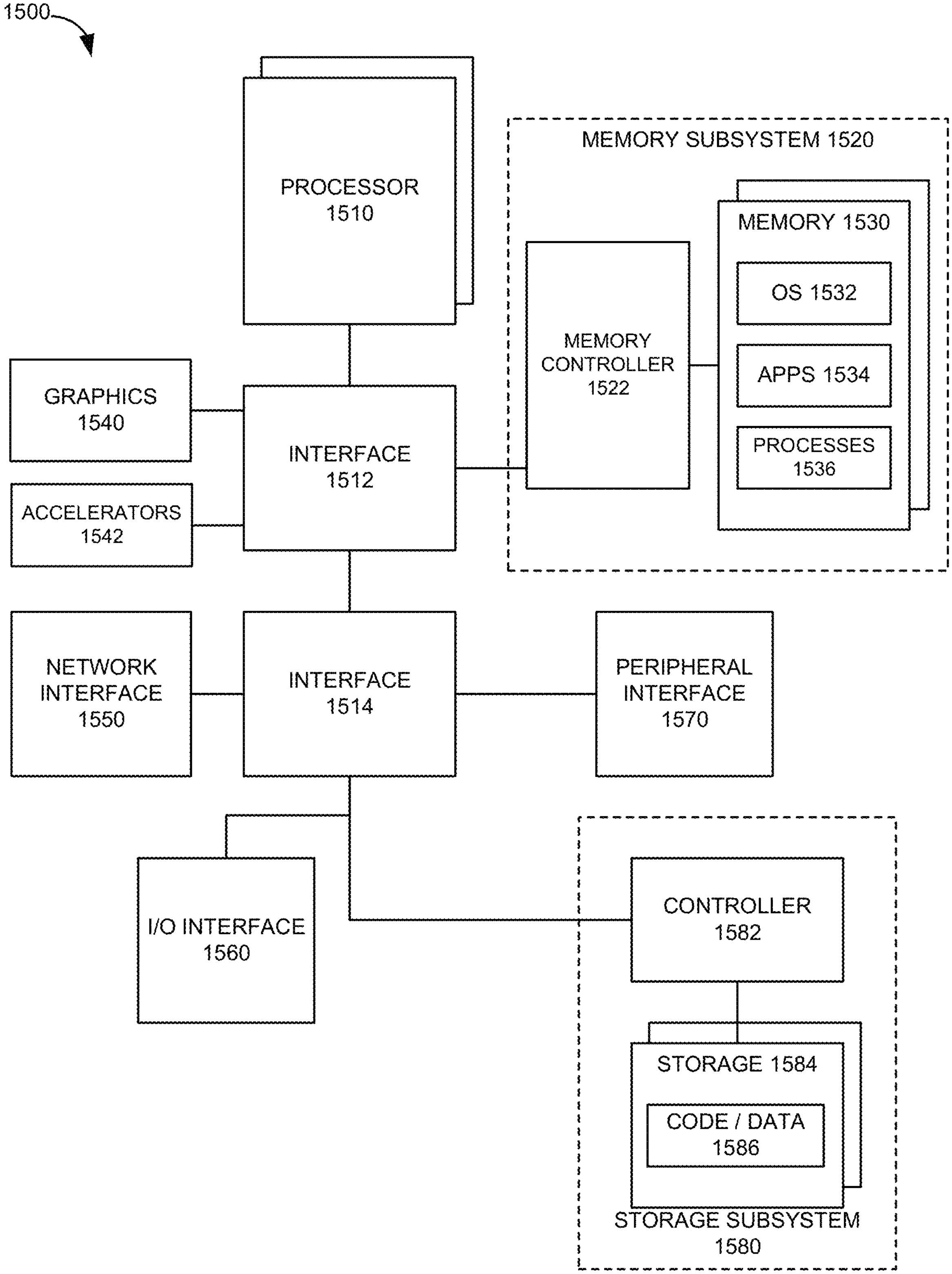
FIG. 15 depicts an example system.

FIG. 15 depicts an example system. Components of system 1500 (e.g., processor 1510, graphics 1540, accelerators 1542, memory 1530, storage 1584, network interface 1550, and so forth) can include configurable processing units based on a compiled program, as described herein. System 1500 includes processor 1510, which provides processing, operation management, and execution of instructions for system 1500. Processor 1510 can include any type of microprocessor, central processing unit (CPU), graphics processing unit (GPU), processing core, or other processing hardware to provide processing for system 1500, or a combination of processors. Processor 1510 controls the overall operation of system 1500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1500 includes interface 1512 coupled to processor 1510, which can represent a higher speed interface or a high throughput interface for system components that needs higher bandwidth connections, such as memory subsystem 1520 or graphics interface components 1540, or accelerators 1542. Interface 1512 represents an interface circuit, which can be a standalone component or integrated onto a processor die.

Accelerators 1542 can be a fixed function or programmable offload engine that can be accessed or used by a processor 1510. For example, an accelerator among accelerators 1542 can provide compression (DC) capability, cryptography services such as public key encryption (PKE), cipher, hash/authentication capabilities, decryption, or other capabilities or services. In some cases, accelerators 1542 can be integrated into a CPU socket (e.g., a connector to a motherboard or circuit board that includes a CPU and provides an electrical interface with the CPU). For example, accelerators 1542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1542 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1520 represents the main memory of system 1500 and provides storage for code to be executed by processor 1510, or data values to be used in executing a routine. Memory subsystem 1520 can include one or more memory devices 1530 such as read-only memory (ROM), flash memory, one or more varieties of random access memory (RAM) such as DRAM, or other memory devices, or a combination of such devices. Memory 1530 stores and hosts, among other things, operating system (OS) 1532 to provide a software platform for execution of instructions in system 1500. Additionally, applications 1534 can execute on the software platform of OS 1532 from memory 1530. Applications 1534 represent programs that have their own operational logic to perform execution of one or more functions. Processes 1536 represent agents or routines that provide auxiliary functions to OS 1532 or one or more applications 1534 or a combination. OS 1532, applications 1534, and processes 1536 provide software logic to provide functions for system 1500. In one example, memory subsystem 1520 includes memory controller 1522, which is a memory controller to generate and issue commands to memory 1530. It will be understood that memory controller 1522 could be a physical part of processor 1510 or a physical part of interface 1512. For example, memory controller 1522 can be an integrated memory controller, integrated onto a circuit with processor 1510.

While not specifically illustrated, it will be understood that system 1500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1500 includes interface 1514, which can be coupled to interface 1512. In one example, interface 1514 represents an interface circuit, which can include standalone components and integrated circuitry. In one example, multiple user interface components or peripheral components, or both, couple to interface 1514. Network interface 1550 provides system 1500 the ability to communicate with remote devices (e.g., servers or other computing devices) over one or more networks. Network interface 1550 can include an Ethernet adapter, wireless interconnection components, cellular network interconnection components, USB (universal serial bus), or other wired or wireless standards-based or proprietary interfaces. Network interface 1550 can transmit data to a device that is in the same data center or rack or a remote device, which can include sending data stored in memory.

Network interface 1550 can include one or more of: a network interface controller (NIC), a remote direct memory access (RDMA)-enabled NIC, SmartNIC, router, switch, or network-attached appliance. Some examples of network interface 1550 are part of an Infrastructure Processing Unit (IPU) or data processing unit (DPU) or utilized by an IPU or DPU. An XPU or xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. A programmable pipeline can be programmed using a packet processing pipeline program.

In one example, system 1500 includes one or more input/output (I/O) interface(s) 1560. I/O interface 1560 can include one or more interface components through which a user interacts with system 1500 (e.g., audio, alphanumeric, tactile/touch, or other interfacing). Peripheral interface 1570 can include any hardware interface not specifically mentioned above. Peripherals refer generally to devices that connect dependently to system 1500. A dependent connection is one where system 1500 provides the software platform or hardware platform or both on which operation executes, and with which a user interacts.

In one example, system 1500 includes storage subsystem 1580 to store data in a nonvolatile manner. In one example, in certain system implementations, at least certain components of storage 1580 can overlap with components of memory subsystem 1520. Storage subsystem 1580 includes storage device(s) 1584, which can be or include any conventional medium for storing large amounts of data in a nonvolatile manner, such as one or more magnetic, solid state, or optical based disks, or a combination. Storage 1584 holds code or instructions and data 1586 in a persistent state (e.g., the value is retained despite interruption of power to system 1500). Storage 1584 can be generically considered to be a "memory," although memory 1530 is typically the executing or operating memory to provide instructions to processor 1510. Whereas storage 1584 is nonvolatile, memory 1530 can include volatile memory (e.g., the value or state of the data is indeterminate if power is interrupted to system 1500). In one example, storage subsystem 1580 includes controller 1582 to interface with storage 1584. In one example controller 1582 is a physical part of interface 1514 or processor 1510 or can include circuits or logic in both processor 1510 and interface 1514.

A volatile memory is memory whose state (and therefore the data stored in it) is indeterminate if power is interrupted to the device. An example of a volatile memory include a cache. A non-volatile memory (NVM) device is a memory whose state is determinate even if power is interrupted to the device.

In an example, system 1500 can be implemented using interconnected compute sleds of processors, memories, storages, network interfaces, and other components. High speed interconnects or device interfaces can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), Universal Chiplet Interconnect Express (UCIe), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe (e.g., Non-Volatile Memory Express (NVMe) Specification, revision 1.3c, published on May 24, 2018 or earlier or later versions, or revisions thereof).

Communications between devices can take place using a network that provides die-to-die communications; chip-to-chip communications; circuit board-to-circuit board communications; and/or package-to-package communications. Die-to-die communications can be consistent with Embedded Multi-Die Interconnect Bridge (EMIB), interposer, or other interfaces (e.g., Universal Chiplet Interconnect Express (UCIe), described at least in UCIe 1.0 Specification (2022), as well as earlier versions, later versions, and variations thereof).

Figure 16:
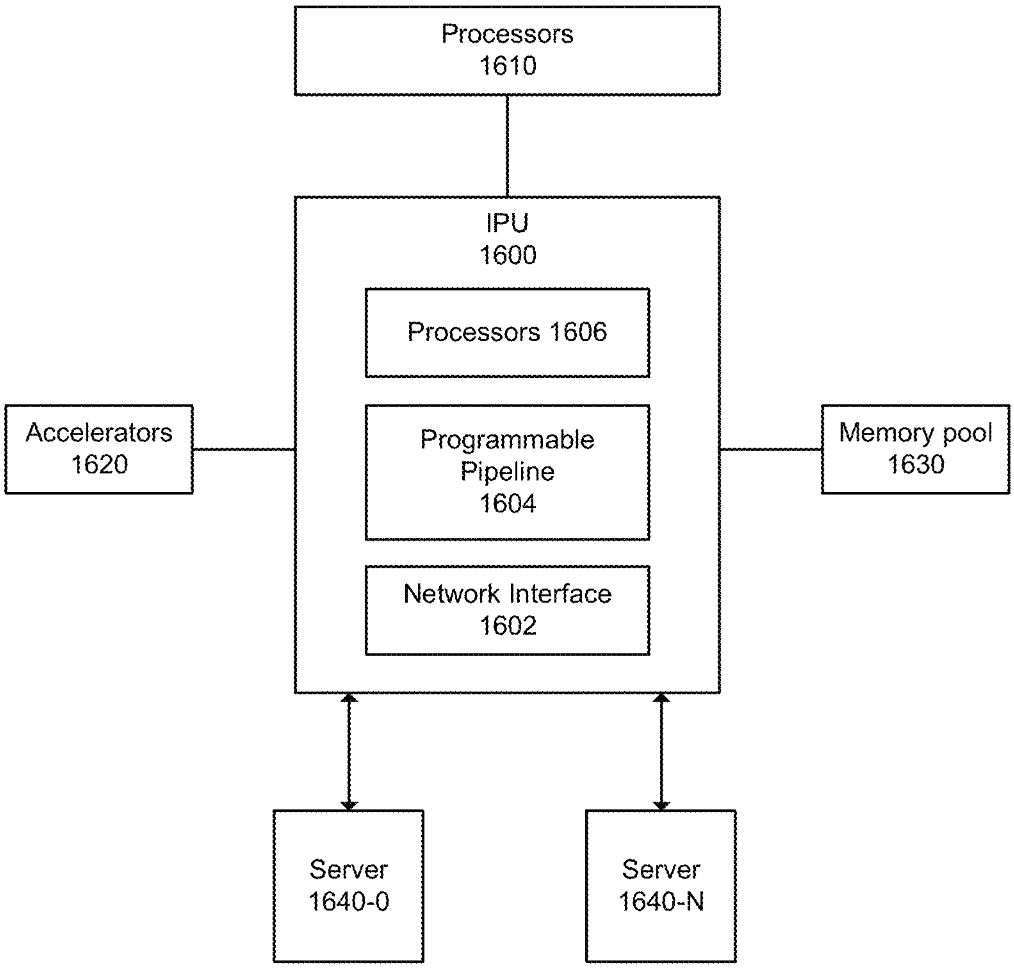
FIG. 16 depicts an example system.

FIG. 16 depicts an example system. In this system, IPU 1600 manages performance of one or more processes using one or more of processors 1606, processors 1610, accelerators 1620, memory pool 1630, or servers 1640-0 to 1640-N, where N is an integer of 1 or more. In some examples, processors 1606 of IPU 1600 can execute one or more processes, applications, virtual machines (VMs), containers, microservices, and so forth that request performance of workloads by one or more of: processors 1610, accelerators 1620, memory pool 1630, and/or servers 1640-0 to 1640-N. IPU 1600 can utilize network interface 1602 or one or more device interfaces to communicate with processors 1610, accelerators 1620, memory pool 1630, and/or servers 1640-0 to 1640-N. IPU 1600 can utilize programmable pipeline 1604 to process packets that are to be transmitted from network interface 1602 or packets received from network interface 1602. Programmable pipeline 1604 and/or processors 1606 can include configurable processing units based on a compiled program.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), micro data center, on-premise data centers, off-premise data centers, edge network elements, fog network elements, and/or hybrid data centers (e.g., data center that use virtualization, content delivery network (CDN), cloud and software-defined networking to deliver application workloads across physical data centers and distributed multi-cloud environments). Systems and components described herein can be made available for use by a cloud service provider (CSP), or communication service provider (CoSP).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission, or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes one or more examples, and includes an apparatus that includes: a network interface device that includes a programmable event processing architecture that includes a plurality of programmable event processors, that when operational, are to: perform memory accesses separate from compute operations, group one or more events into at least one group, enforce atomic processing of other events within a group of the at least one group, wherein the atomic processing comprises propagation of state changes to among events of the group, and perform parallel processing of events belonging to different groups.

Example 2 includes one or more examples, wherein the at least one group is based on a connection identifier.

Example 3 includes one or more examples, wherein the plurality of programmable event processors are to enforce atomic processing of events within a group of the at least one group by waiting to process an event from a group until previous event belonging to the group has completed processing.

Example 4 includes one or more examples, wherein at least one of the plurality of programmable event processors comprises circuitry to perform read, modify, write of global state for atomic accesses between events belonging to different groups.

Example 5 includes one or more examples, wherein at least one of the plurality of programmable event processors comprises fixed function circuitry to perform memory access patterns associated with event processing.

Example 6 includes one or more examples, wherein at least one of the plurality of programmable event processors comprises at least one programmable compute engine to update event data and memory data.

Example 7 includes one or more examples, wherein at least one of the plurality of programmable event processors comprises compute resources and/or memory resources.

Example 8 includes one or more examples, and includes compute resources and/or memory resources, wherein the compute resources and/or memory resources are flexibly allocated to the plurality of programmable event processors.

Example 9 includes one or more examples, wherein programmable event processors comprises compute resources, wherein the compute resources comprise one or more of: a core with register file, instruction memory, and/or arithmetic logic unit (ALU).

Example 10 includes one or more examples, wherein the plurality of programmable event processors are programmed using an event graph description with defined nodes.

Example 11 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

Example 12 includes one or more examples, and includes at least one non-transitory computer-readable medium, comprising instructions stored thereon, that if executed by one or more processors, cause the one or more processors to: configure a plurality of programmable event processors of a network interface device to: perform memory accesses separate from compute operations, group one or more events into at least one group, enforce atomic processing of other events within a group of the at least one group, wherein the atomic processing comprises propagation of state changes to among events of the group, and perform parallel processing of events belonging to different groups.

Example 13 includes one or more examples, wherein the at least one group is based on a connection identifier.

Example 14 includes one or more examples, wherein the plurality of programmable event processors are to enforce atomic processing of events within a group of the at least one group by waiting to process an event from a group until previous event belonging to the group has completed processing.

Example 15 includes one or more examples, wherein at least one of the plurality of programmable event processors comprises circuitry to perform read, modify, write of global state for atomic accesses between events belonging to different groups.

Example 16 includes one or more examples, wherein the programmable event processing architecture is configured by a program based on one or more of: Protocol-independent Packet Processors (P4), Software for Open Networking in the Cloud (SONiC), Broadcom® Network Programming Language (NPL), NVIDIA® CUDA®, NVIDIA® DOCA™, or Infrastructure Programmer Development Kit (IPDK), or eBPF.

Example 17 includes one or more examples, and includes a method that includes: in a data center: a network interface device comprising a plurality of programmable event processors and a server configuring the plurality of programmable event processors to: perform memory accesses separate from compute operations, group one or more events into at least one group, enforce atomic processing of other events within a group of the at least one group, wherein the atomic processing comprises propagation of state changes to among events of the group, and perform parallel processing of events belonging to different groups.

Example 18 includes one or more examples, wherein the plurality of programmable event processors enforce atomic processing of events within a group of the at least one group by waiting to process an event from a group until previous event belonging to the group has completed processing.

Example 19 includes one or more examples, wherein at least one of the plurality of programmable event processors comprises circuitry to perform read, modify, write of global state for atomic accesses between events belonging to different groups.

Example 20 includes one or more examples, wherein at least one of the plurality of programmable event processors comprises compute resources and/or memory resources.

What is claimed is:

1. An apparatus comprising:

a network interface device comprising:

a programmable event processing architecture comprising a plurality of programmable event processors, that when operational, are to:

decouple memory access from compute, group events by connection or flow, enforce atomic state updates within different groups of events, perform parallel event processing across the different groups of events, perform read-modify-write (RMW) operations on state data in memory for a first flow within a first number of clock cycles, wherein the RMW operations comprise propagation of state changes for packets of the first flow, and in parallel to the RMW operations on the state data for the first flow, perform RMW operations on data within a second number of clock cycles, wherein the first number of clock cycles is less than the second number of clock cycles.

2. The apparatus of claim 1, wherein the first flow is associated with a connection identifier.

3. The apparatus of claim 1, wherein the plurality of programmable event processors are to enforce atomic processing of events by waiting to process an event from a group until a previous event belonging to the group has completed processing.

4. The apparatus of claim 1, wherein at least one of the plurality of programmable event processors comprises circuitry to perform read, modify, write of global state for atomic accesses between events belonging to different groups.

5. The apparatus of claim 1, wherein at least one of the plurality of programmable event processors comprises fixed function circuitry to perform memory access patterns associated with event processing.

6. The apparatus of claim 1, wherein at least one of the plurality of programmable event processors comprises at least one programmable compute engine to update event data and memory data.

7. The apparatus of claim 1, wherein at least one of the plurality of programmable event processors comprises one or more of: compute resources or memory resources.

8. The apparatus of claim 1, comprising one or more of: compute resources or memory resources, wherein the compute resources and memory resources are flexibly allocated to the plurality of programmable event processors.

9. The apparatus of claim 1, wherein programmable event processors comprises compute resources, wherein the compute resources comprise one or more arithmetic logic units (ALUs).

10. The apparatus of claim 1, wherein the plurality of programmable event processors are programmed using an event graph description with defined nodes.

11. The apparatus of claim 1, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

12. At least one non-transitory computer-readable medium, comprising instructions stored thereon, that if executed by one or more processors, cause the one or more processors to:

configure a plurality of programmable event processors of a network interface device to:

perform read-modify-write (RMW) operations on state data in memory for a first flow within a first number of clock cycles, wherein the RMW operations comprise propagation of state changes for packets of the first flow, and in parallel with the RMW operations on the state data for the first flow, perform RMW operations on data within a second number of clock cycles, wherein the first number of clock cycles is less than the second number of clock cycles, wherein:

the plurality of programmable event processors are to:

decouple memory access from compute, group events by connection or flow, enforce atomic state updates within different groups of events, and perform parallel event processing across the different groups of events.

13. The non-transitory computer-readable medium of claim 12, wherein the first flow is associated with a connection identifier.

14. The non-transitory computer-readable medium of claim 12, wherein the plurality of programmable event processors are to enforce atomic processing of events by waiting to process an event from a group until a previous event belonging to the group has completed processing.

15. The non-transitory computer-readable medium of claim 12, wherein at least one of the plurality of programmable event processors comprises circuitry to perform read, modify, write of global state for atomic accesses between events belonging to different groups.

16. The non-transitory computer-readable medium of claim 12, wherein the programmable event processors are configured by a program based on one or more of: Protocol-independent Packet Processors (P4), Software for Open Networking in the Cloud (SONiC), Broadcom® Network Programming Language (NPL), NVIDIA® CUDA®, NVIDIA® DOCA™, or Infrastructure Programmer Development Kit (IPDK), or eBPF.

17. A method comprising:

in a data center:

a network interface device comprising a plurality of programmable event processors and a server configuring the plurality of programmable event processors to:

decouple memory access from compute, group events by connection or flow, enforce atomic state updates within different groups of events, perform parallel event processing across the different groups of events, perform read-modify-write (RMW) operations on state data in memory for a first flow within a first number of clock cycles, wherein the RMW operations comprise propagation of state changes for packets of the first flow, and in parallel with the RMW operations on the state data for the first flow, perform RMW operations on data within a second number of clock cycles, wherein the first number of clock cycles is less than the second number of clock cycles.

18. The method of claim 17, wherein the plurality of programmable event processors enforce atomic processing of events by waiting to process an event from a group until a previous event belonging to the group has completed processing.

19. The method of claim 17, wherein at least one of the plurality of programmable event processors comprises circuitry to perform read, modify, write of global state for atomic accesses between events belonging to different groups.

20. The method of claim 17, wherein at least one of the plurality of programmable event processors comprises compute resources or memory resources.

* * * * *